(12) United States Patent
Futaki

(10) Patent No.: US 11,652,599 B2
(45) Date of Patent: May 16, 2023

(54) METHOD AND APPARATUS FOR RADIO LINK MONITORING MEASUREMENTS IN A SYSTEM USING BANDWIDTH PARTS

(71) Applicant: NEC Corporation, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/523,102

(22) Filed: Nov. 10, 2021

(65) Prior Publication Data
US 2022/0069966 A1 Mar. 3, 2022

Related U.S. Application Data

(63) Continuation of application No. 16/762,577, filed as application No. PCT/JP2018/030310 on Aug. 14, 2018, now Pat. No. 11,218,280.

(30) Foreign Application Priority Data

Nov. 13, 2017 (JP) .............................. JP2017-218040

(51) Int. Cl.
*H04L 5/00* (2006.01)
*H04W 76/18* (2018.01)
*H04B 7/06* (2006.01)
*H04W 24/08* (2009.01)
*H04W 24/10* (2009.01)
*H04W 56/00* (2009.01)

(52) U.S. Cl.
CPC ......... *H04L 5/0092* (2013.01); *H04B 7/0626* (2013.01); *H04L 5/0051* (2013.01); *H04W 24/08* (2013.01); *H04W 24/10* (2013.01); *H04W 56/001* (2013.01); *H04W 76/18* (2018.02)

(58) Field of Classification Search
CPC ..... H04L 5/0092; H04L 5/0051; H04L 5/001; H04L 5/0048; H04L 5/0098; H04B 7/0626; H04W 24/08; H04W 24/10; H04W 56/001; H04W 76/18; H04W 36/06; H04W 36/0094; H04W 56/00; H04W 72/0453
See application file for complete search history.

(56) References Cited

U.S. PATENT DOCUMENTS

2013/0250782 A1    9/2013   Nimbalker et al.

FOREIGN PATENT DOCUMENTS

| CN | 104205697 A | 12/2014 |
|---|---|---|
| CN | 104303562 A | 1/2015 |
| CN | 107210826 A | 9/2017 |

OTHER PUBLICATIONS

RLM/RLF for bandwidth parts (Year: 2017).*

(Continued)

*Primary Examiner* — Ayanah S George
(74) *Attorney, Agent, or Firm* — Sughrue Mion, PLLC

(57) ABSTRACT

When a downlink bandwidth part (BWP) is switched from a first BWP to a second BWP without a change of a cell defining synchronization signal block (SSB), if a reference signal type for Radio Link Monitoring (RLM) is set to an SSB type, a radio terminal (12) continues to use for RLM measurements a first SSB associated with the first BWP after switching of the downlink BWP to the second BWP. This for example enables the radio terminal to monitor a suitable Reference Signal (RS) for RLM measurements after switching of the DL active BWP.

15 Claims, 14 Drawing Sheets

(56) References Cited

OTHER PUBLICATIONS

On Bandwidth Parts and Multiple SSBs (Year: 2017).*
The Needs of Measurement Gap in NR (Year: 2017).*
"On bandwidth parts and "RF" requiremems", Ericsson, 3GPP TSG RAN1 NR Ad-Hoc#2, R1-1711795, Jun. 27-30, 2017, 9 pages.
"LS on Bandwidth Part Operation in NR", 3GPP TSG RAN WG2#98, R2-1707624, R1-1711998, Aug. 2017, 3 pages.
"LS on Further agreements for Bandwidth part operation", 3GPP TSG RAN WG1 Meeting #90, 3GPP TSG RAN WG2#99bis, R1-1710012. R1-1714996, Oct. 9-12, 2017, 2 pages.
"Reply LS on multiple SSBs within a wideband carrier", 3GPP TSG RAN WG1 NR Ad-hoc#3, 3GPP TSG RAN WG2#99bis, R2-1710031, R1-1716907. Oct. 9-13, 2017, 1 page.
"Initial discussion on the impacts of BWP on RAN2", ZTE Corporation, Sane Chips, 3GFP TSG-RAN WG2 Meeting #99bis, R2-1711640, Oct. 9-13, 2017, 5 pages.
"Text Proposal for L1 parameters for 38.331" Ericsson, 3GPP TSG-RAN WG2 #99bis, Tdoc R2-1711969, Oct. 9-13, 2017, 26 pages.
"LS on multiple SSBs within a wideband carrier", 3GPP TSG RAN WG2#99, R2-1709861. R1-1715071, Aug. 21-25, 2017, 1 page.
"RLM/RLF for bandwidth part", Samsung, GPP TSG-RAN WG2 #99bis, R2-1711404. Oct. 9-13, 2017, 3 pages.
"On Bandwidth Parts and Muliple SSSs", Ericsson 3GPP TSG-Ran WG2 #99bis. Tdoc R2-1711822, Oct. 9-13, 2017, 6 pages.
"Mutiple SS Blocks per carrier", Ericsson, 3GPP TSG RAN WG1 #90, R1-1712954, Aug. 21-25, 2017, 4 pages.
International Search Report for PCT/JP2018/030310 dated Oct. 23, 2018 [PCT/ISA/210].
Extended European Search Report for EP Application No. EP18677155.4 dated Dec. 10, 2020.
Mediatek Inc., "The needs of Measurement Gap in NR", 3GPP, Draft; R4-1710670, 3GPP TSG-RAN WG4 Meeting #84bis, Oct. 8, 2017, Dubrovnik.
ETSI MCC, "Report of 3GPP TSG RAN2#99bis meeting, Prague, Czech Republic", 3GPP , Draft; R2-1712xxx, DRAFT_RAN2#99BIS_MEETING_REPORT_V1, 3GPP TSG-RAN WG2 meeting #100, Oct. 23, 2017, pp. 1-238.
NEC, "Classification on BWP set configuration", 3GPP DRAFT: R2-1713729, 3GPP TSG-RAN WG2 #100, Nov. 17, 2017, USA.
Indian Office Action for IN Application No. 202017019306 dated Jun. 21, 2021.
Korean NOA for Application No. 10-2020-7016844 date Feb. 4, 2022.
Samsung, "The Impact of Bandwidth Part on RAN2: Overview and Issues", 3GPP TSG-RAN WG2 #99bis R2-1711595, Oct. 9-13, 2017.
NEC, "RLM/RRM measurements after BWP switching", 3GPP TSG RAN WG2 NR Ad hoc 1801 R2-1801139, Jan. 22-26, 2018.
3GPP, "RAN4 NR#3 Meeting report", 3GPP TSG RAN WG4 Meeting #84bis R4-1710102 Oct. 9-13, 2017.
Korean Office Action for KR Application No. 10-2020-7016844 dated Nov. 3, 2021 with English Translation.
LG Electronics Inc., "RRC Procedures for BWP Configuration", 3GPP TSG RAN WG2 #99bis, R2-1711383, 3GPP, Sep. 29, 2017.
Chinese Office Action for CN Application No. 201880085954.3, dated Feb. 15, 2023 with English Translation.
ETSI MCC, "Report of 3GPP TSG RAN2#99bis meeting", Prague, Czech Republic R2-1712101, Oct. 23, 2017.

* cited by examiner

METHOD AND APPARATUS FOR RADIO LINK MONITORING MEASUREMENTS IN A SYSTEM USING BANDWIDTH PARTS

CROSS-REFERENCE TO RELATED APPLICATIONS

The present application is a divisional application of U.S. patent application Ser. No. 16/762,577 filed on May 8, 2020, which is a National Stage Entry of international application PCT/JP2018/030310, filed Aug. 14, 2018, which claims the benefit of priority from Japanese Patent Application 2017-218040 filed on Nov. 13, 2017, the disclosures of all of which are incorporated in their entirety by reference herein.

TECHNICAL FIELD

The present disclosure relates to a radio communication system and, in particular, to a radio communication system using one or more bandwidth parts configured within one carrier bandwidth.

BACKGROUND ART

The 3rd Generation Partnership Project (3GPP) has been working on the standardization for the fifth generation mobile communication system (5G) to make 5G a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a 5G-RAN or a NextGen RAN (NG RAN). A new base station in the NG-RAN is referred to as a NR NodeB (NR NB) or a gNodeB (gNB). A new core network for the 5G System is referred to as a 5G Core Network (5G-CN or 5GC) or a NextGen Core (NG Core). A radio terminal (i.e., User Equipment (UE)) capable of being connected to the 5G System is referred to as 5G UE or NextGen UE (NG UE), or simply referred to as UE. The official names of the RAT, UE, radio access network, core network, network entities (nodes), protocol layers and the like for the NG System will be determined in the future as standardization work progresses.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN (E-UTRAN)) and a core network (i.e., EPC). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS.

In contrast, with regard to the 5G System, it is discussed that although radio bearers may be used in the NG RAN, no bearers are used in the 5GC or in the interface between the 5GC and the NG-RAN. Specifically, PDU flows are defined instead of an EPS bearer, and one or more SDFs are mapped to one or more PDU flows. A PDU flow between a 5G UE and a user-plane terminating entity in an NG Core (i.e., an entity corresponding to a P-GW in the EPC) corresponds to an EPS bearer in the EPS Bearer-based QoS concept. The PDU flow corresponds to the finest granularity of the packet forwarding and treatment in the 5G system. That is, the 5G System adopts the Flow-based QoS (or per-flow QoS) concept instead of the Bearer-based QoS concept. In the Flow-based QoS concept, QoS is handled per PDU flow. Association between a 5G UE and a data network is referred to as a "PDU session". The term "PDU session" corresponds to the term "PDN connection" in LTE and LTE-Advanced. A plurality of PDU flows can be configured in one PDU session. The 3GPP specifications define a 5G QoS Indicator (5QI) corresponding to the QCI of the LTE for the 5G system.

The PDU flow is also referred to as a "QoS flow". The QoS flow is the finest granularity in QoS treatment in the 5G system. User plane traffic having the same N3 marking value in a PDU session corresponds to a QoS flow. The N3 marking corresponds to the above-described PDU flow ID, and it is also referred to as a QoS flow Identity (QFI) or a Flow Identification Indicator (FII). There is one-to-one relationship (i.e., one-to-one mapping) at least between each 5QI defined in the specification and a corresponding QFI having the same value (or number) as this 5QI.

FIG. 1 shows a basic architecture of the 5G system. A UE establishes one or more Signaling Radio Bearers (SRBs) and one or more Data Radio Bearers (DRBs) with a gNB. The 5GC and the gNB establish a control plane interface and a user plane interface for the UE. The control plane interface between the 5GC and the gNB (i.e., RAN) is referred to as an N2 interface, an NG2 interface or an NG-c interface, and is used for transfer of Non-Access Stratum (NAS) information and for transfer of control information (e.g., N2 AP Information Element) between the 5GC and the gNB. The user plane interface between the 5GC and the gNB (i.e., RAN) is referred to as an N3 interface, an NG3 interface or an NG-u interface, and is used for transfer of packets of one or more PDU flows in a PDU session of the UE.

Note that, the architecture shown in FIG. 1 is merely one of the 5G architecture options (or deployment scenarios). The architecture shown in FIG. 1 is referred to as "Standalone NR (in NextGen System)" or "Option 2". The 3GPP further discusses network architectures for multi-connectivity operations using the E-UTRA and NR radio access technologies. A representative example of the multi-connectivity operations is Dual Connectivity (DC) in which one Master node (MN) and one Secondary node (SN) cooperate with each other and simultaneously communicate with one UE. The Dual Connectivity operation using the E-UTRA and NR radio access technologies is referred to as Multi-RAT Dual Connectivity (MR-DC). The MR-DC is dual connectivity between E-UTRA and NR nodes.

In the MR-DC, one of the E-UTRA node (i.e., eNB) and the NR node (i.e., gNB) operates as a Master node (MN), while the other one operates as a Secondary node (SN), and at least the MN is connected to the core network. The MN provides one or more Master Cell Group (MCG) cells to the UE, while the SN provides one or more Secondary Cell Group (SCG) cells to the UE. The MR-DC includes "MR-DC with the EPC" and "MR-DC with the 5GC".

The MR-DC with the EPC includes E-UTRA-NR Dual Connectivity (EN-DC). In the EN-DC, the UE is connected to an eNB operating as the MN and a gNB operating as the SN. Further, the eNB (i.e., Master eNB) is connected to the EPC, while the gNB (i.e. Secondary gNB) is connected to the Master eNB through the X2 interface.

The MR-DC with the 5GC includes NR-E-UTRA Dual Connectivity (NE-DC) and NG-RAN E-UTRA-NR Dual Connectivity (NG-EN-DC). In the NE-DC, the UE is connected to a gNB operating as the MN and an eNB operating as the SN, the gNB (i.e., Master gNB) is connected to the 5GC, and the eNB (i.e. Secondary eNB) is connected to the Master gNB through the Xn interface. On the other hand, in the NG-EN-DC, the UE is connected to an eNB operating as the MN and a gNB operating as the SN, and the eNB (i.e., Master eNB) is connected to the 5GC, and the gNB (i.e. Secondary gNB) is connected to the Master eNB through the Xn interface.

FIGS. 2, 3 and 4 show the network configurations of the above-described three DC types: EN-DC, NE-DC and NG-EN-DC, respectively. Note that, although the Secondary gNB (SgNB) in the EN-DC of FIG. 2 is also referred to as en-gNB, and the Secondary eNB (SeNB) in the NE-DC of FIG. 3 and the Master eNB (MeNB) in the NG-EN-DC of FIG. 4 are also referred to as ng-eNB, they are simply referred to as gNB or eNB in this specification. The 5G System further supports dual connectivity between two gNBs. In this specification, dual connectivity between two gNBs is referred to as NR-NR DC. FIG. 5 shows the network configuration of NR-NR DC.

The NR is expected to use different sets of radio parameters in multiple frequency bands. Each radio parameter set is referred to as "numerology". OFDM numerology for an Orthogonal Frequency Division Multiplexing (OFDM) system includes, for example, subcarrier spacing, system bandwidth, Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on service requirements.

The UE and the NR gNB in the 5G system support aggregation of multiple NR carriers with different numerologies. The 3GPP discusses achievement of aggregation of multiple NR carriers (or NR cells) with different numerologies by lower layer aggregation, such as the existing LTE Carrier Aggregation (CA), or higher layer aggregation, such as the existing Dual Connectivity.

The 5G NR supports channel bandwidths wider than those of the LTE (e.g., 100s of MHz). One channel bandwidth (i.e., a $BW_{Channel}$) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 500 MHz.

In order to effectively support multiple 5G services, such as wideband services like eMBB and narrow-bandwidth services like Internet of Things (IoT), it is preferable to multiplex these services onto a single channel bandwidth. Further, if every 5G UE needs to support transmission and reception in a transmission bandwidth corresponding to the entire channel bandwidth, this may hinder achievement of lower cost and lower power consumption of UEs for narrow-bandwidth IoT services. Thus, the 3GPP allows one or more bandwidth parts (BWPs) to be configured in the carrier bandwidth (i.e., channel bandwidth or system bandwidth) of each NR component carrier. Multiple BWPs in one NR channel bandwidth may be used for different frequency division multiplexing (FDM) schemes using different numerologies (e.g., subcarrier spacing (SCS)). The bandwidth part is also referred to as carrier bandwidth part.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not include a SS/PBCH block (SSB). A BWP configuration includes, for example, numerology, a frequency location, and a bandwidth (e.g., the number of PRBs). In order to specify the frequency location, common PRB indexing is used at least for a downlink (DL) BWP configuration in a Radio Resource Control (RRC) connected state. Specifically, an offset from PRB 0 to the lowest PRB of the SSB to be accessed by a UE is configured by higher layer signaling. The reference point "PRB 0" is common to all the UEs that share the same wideband component carrier.

One SS/PBCH block includes primary signals necessary for an idle UE, such as NR synchronization signals (NR-SS) and an NR physical broadcast channel (NR-PBCH). The NR-SS is used by the UE for DL synchronization. A Reference Signal (RS) is transmitted in the SS/PBCH block to enable an idle UE to perform Radio Resource Management (RRM) measurement (e.g., RSRP measurement). This RS may be the NR-SS itself or may be an additional RS. The NR-PBCH broadcasts part of the minimum System Information (SI), for example a Master Information Block (MIB). The remaining minimum SI (RMSI) is transmitted on a Physical Downlink Shared Channel (PDSCH).

A network can transmit multiple SS/PBCH blocks within the channel bandwidth of one wideband component carrier. In other words, SS/PBCH blocks may be transmitted in a plurality of BWPs within the channel bandwidth. In a first scheme, all the SS/PBCH blocks within one broadband carrier are based on NR-SS (e.g., a primary SS (PSS) and a secondary SS (SSS)) corresponding to the same physical-layer cell identity. In a second scheme, different SS/PBCH blocks within one broadband carrier may be based on NR-SS corresponding to different physical-layer cell identities.

From a UE perspective, a cell is associated with one SS/PBCH block. Therefore, for UEs, each serving cell has a single associated SS/PBCH block in frequency domain. Note that, each serving cell is a primary cell (PCell) in carrier aggregation (CA) and dual connectivity (DC), a primary secondary cell (PSCell) in DC, or a secondary cell (SCell) in CA and DC. Such an SSB is referred to as a cell defining SS/PBCH block. The Cell defining SS/PBCH block has an associated RMSI. The Cell defining SS/PBCH block is used as the time reference or the timing reference of the serving cell. Further, the Cell defining SS/PBCH block is used for SS/PBCH block (SSB) based RRM Measurements. The Cell defining SS/PBCH block can be changed for the PCell/PSCell by "synchronous reconfiguration" (e.g., reconfiguration of radio resource configuration information using an RRC Reconfiguration procedure and not involving a handover), while it can be changed for SCells by "SCell release/add".

One or more BWP configurations for each component carrier are semi-statically signaled to the UE. To be specific, for each UE-specific serving cell, one or more DL BWPs and one or more UL BWPs can be configured for the UE via a dedicated RRC message. Further, each of the one or more BWPs configured for the UE can be activated and deactivated. Activation/deactivation of a BWP is determined not by an RRC layer but by a lower layer (e.g., Medium Access Control (MAC) layer or Physical (PHY) layer). The activated BWP is referred to as active BWP.

Switching of the active BWP may be performed, for example, by Downlink Control Information (DCI) (e.g., scheduling DCI) transmitted on a NR Physical Downlink Control Channel (PDCCH). In other words, deactivation of the current active BWP and activation of a new active BWP may be performed by the DCI in the NR PDCCH. Thus, the network can activate/deactivate a BWP depending, for example, on a data rate, or on numerology required by a service, and can thereby dynamically switch the active BWP for the UE. Activation/deactivation of the BWP may be performed by a MAC Control Element (CE).

FIGS. 6 and 7 show usage examples of BWPs. In the example shown in FIG. 6, the channel bandwidth of one component carrier is divided into BWP #1 and BWP #2, and these two BWPs are used for FDM schemes using different numerologies (e.g., different subcarrier spacing). In the example shown in FIG. 7, narrowband BWP #1 is set in a channel bandwidth of one component carrier and narrowband BWP #2 narrower than BWP #1 is further set within the BWP #1. When BWP #1 or BWP #2 is activated for the UE, this UE can reduce its power consumption by refraining from performing reception and transmission within the channel bandwidth except the active BWP.

Non Patent Literatures 1 to 7 disclose the above-described BWP and cell defining SS/PBCH block.

Further, the 3GPP discusses the requirements for Radio Link Monitoring (RLM) related to the use of BWPs (see Non Patent Literature 8). The RLM procedure is used by the UE in connected mode (i.e., RRC_CONNECTED) in order to measure downlink radio quality of the serving cell for the purpose of detecting out-of-synchronization (out-of-sync) and detecting Radio Link Failure (RLF).

Non Patent Literature 8 discloses the following matters. NR supports RLM in the PCell and the PSCell only. One or more BWPs can be configured per cell for a UE in connected mode semi-statically. The UE can switch a specific BWP for the communication with the gNB among the configured BWPs. This switching is carried out in shorter time scale, such as several scheduling intervals. This specific BWP is called the active BWP. The UE can only access one BWP at a time. The active BWP has at least a Channel State Information Reference Signal (CSI-RS) configured for RRM. The UE is configured with a single RS type, between CSI-RS and SS/PBCH block, as an RS that needs to be monitored for RLM. Even when different types of RS (i.e., CSI-RS and NR-SS) are simultaneously configured in one BWP, only a single RS type is chosen for RLM and its related parameters are used for RLM. It is discussed that, when the DL active BWP is switched (or changed), the UE keeps on-going L3 parameters related to RLM. In this case, even when the DL active BWP is switched, the UE does not reset L3 parameters related to RLM to their default values.

CITATION LIST

Non Patent Literature

Non Patent Literature 1: 3GPP R1-1711795, Ericsson, "On bandwidth parts and "RF" requirements", TSG RAN1 NR Ad-Hoc #2, Qingdao, P.R. China, June 2017

Non Patent Literature 2: 3GPP R2-1707624, "LS on Bandwidth Part Operation in NR", 3GPP TSG RAN WG2 #99, Berlin, Germany, August 2017

Non Patent Literature 3: 3GPP R2-1710012, "LS on Further agreements for Bandwidth part operation", 3GPP TSG RAN WG2 #99bis, Prague, Czech Republic, October 2017

Non Patent Literature 4: 3GPP R2-1710031, "Reply LS on multiple SSBs within a wideband carrier", 3GPP TSG RAN WG2 #99bis, Prague, Czech Republic, October 2017

Non Patent Literature 5: 3GPP R2-1711640, ZTE Corporation, Sane Chips, "Initial discussion on the impacts of BWP on RAN2", 3GPP TSG-RAN WG2 Meeting #99bis, Prague, Czech Republic, October 2017

Non Patent Literature 6: 3GPP R2-1711969, Ericsson, "Text Proposal for L1 parameters for 38.331", 3GPP TSG-RAN WG2 #99bis, Prague, Czech Republic, October 2017

Non Patent Literature 7: 3GPP R2-1709861, "LS on multiple SSBs within a wideband carrier", 3GPP TSG RAN WG2 #99, Berlin, Germany, August 2017

Non Patent Literature 8: 3GPP R2-1711404, Samsung, "RLM/RLF for bandwidth part", 3GPP TSG RAN WG2 #99bis, Prague, Czech Republic, October 2017

SUMMARY OF INVENTION

Technical Problem

As described above, Non Patent Literature 8 discloses that even when different types of RS (i.e., CSI-RS and SS/PBCH block) are simultaneously configured in one BWP, only a single RS type is chosen for RLM and its related parameters are used for RLM. Non Patent Literature 8 also discloses that even when the DL active BWP is switched, the UE, in an example, does not reset L3 parameters related to RLM to their default values. However, there is a problem that, when the DL active BWP is switched, it is unclear which RS the UE should monitor for RLM after the switching. One of the objects to be attained by embodiments disclosed herein is to provide an apparatus, a method, and a program that contribute to solving this problem. It should be noted that this object is merely one of the objects to be attained by the embodiments disclosed herein. Other objects or problems and novel features will be made apparent from the following description and the accompanying drawings.

Solution to Problem

In a first aspect, a radio terminal includes a memory and at least one processor coupled to the memory. The at least one processor is configured to, when a downlink bandwidth part (BWP) is switched from a first BWP to a second BWP without a change of a cell defining synchronization signal block (SSB), if a reference signal type for Radio Link Monitoring (RLM) is set to an SSB type, continue to use for RLM measurements a first SSB associated with the first BWP after switching of the downlink BWP to the second BWP.

In a second aspect, a method performed by a radio terminal comprising, when a downlink bandwidth part (BWP) is switched from a first BWP to a second BWP without a change of a cell defining synchronization signal block (SSB), if a reference signal type for Radio Link Monitoring (RLM) is set to an SSB type, continuing to use for RLM measurements a first SSB associated with the first BWP after switching of the downlink BWP to the second BWP.

In a third aspect, a program includes instructions (software codes) that, when loaded into a computer, cause the computer to perform the method according to the above-described second aspect.

Advantageous Effects of Invention

According to the above-described aspects, it is possible to provide an apparatus, a method, and a program that allow a radio terminal to monitor an appropriate RS for RLM measurements after switching of a DL active BWP.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

Figure 1:
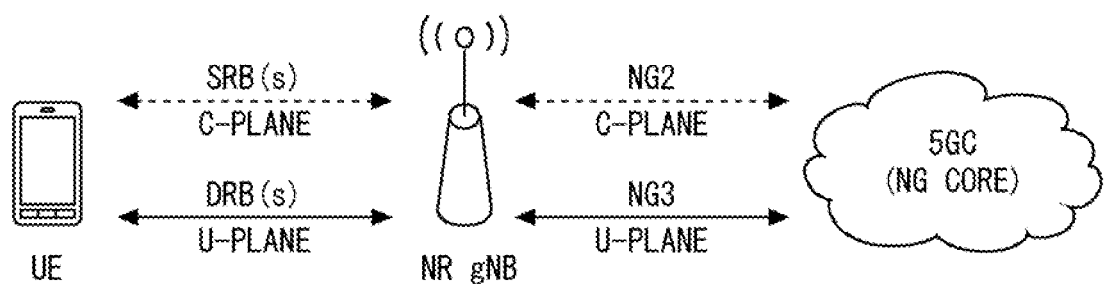
FIG. 1 is a diagram showing a basic architecture of a 5G System.
Figure 2:
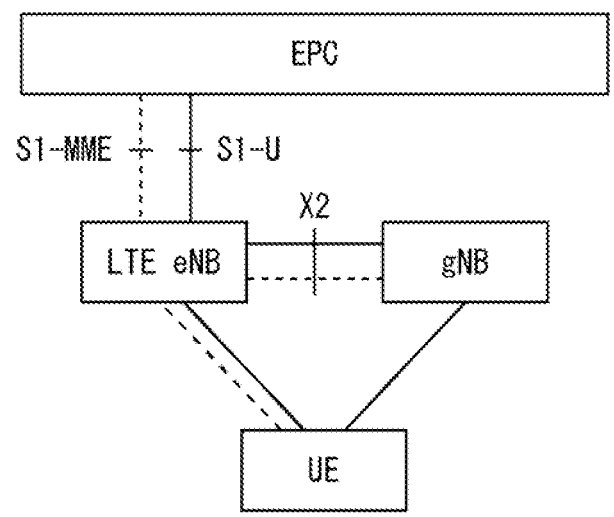
FIG. 2 is a diagram showing a network configuration of EN-DC.
Figure 3:
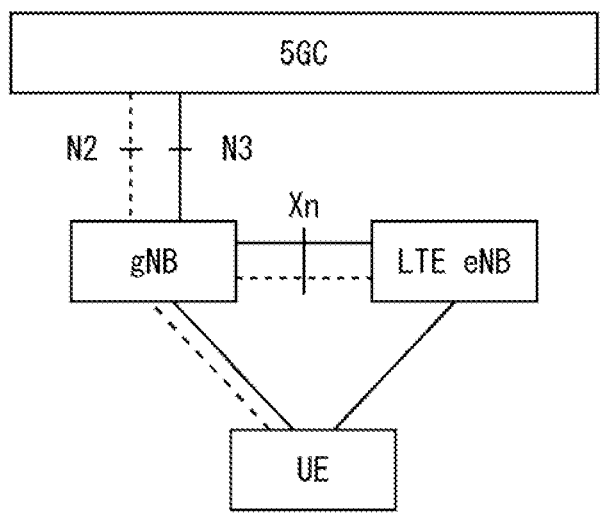
FIG. 3 is a diagram showing a network configuration of NE-DC.
Figure 4:
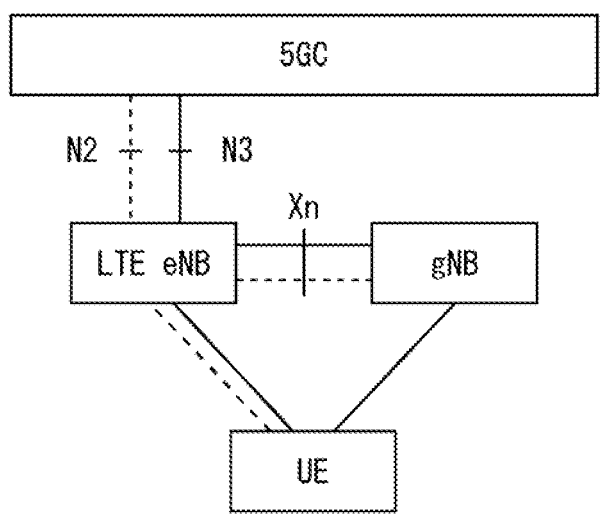
FIG. 4 is a diagram showing a network configuration of NG-EN-DC.
Figure 5:
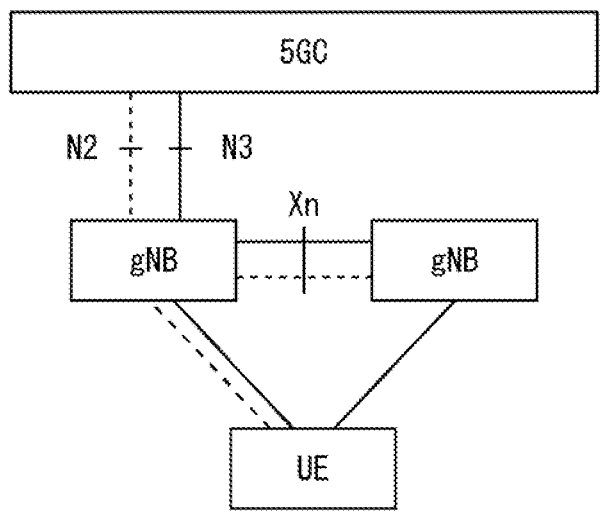
FIG. 5 is a diagram showing a network configuration of NR-NR DC.
Figure 6:
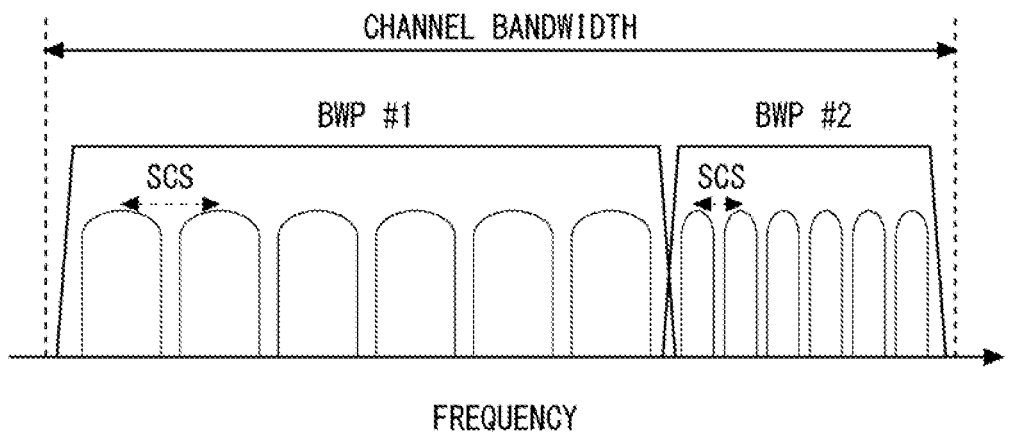
FIG. 6 is a diagram showing an example of use of Bandwidth parts (BWPs)
Figure 7:
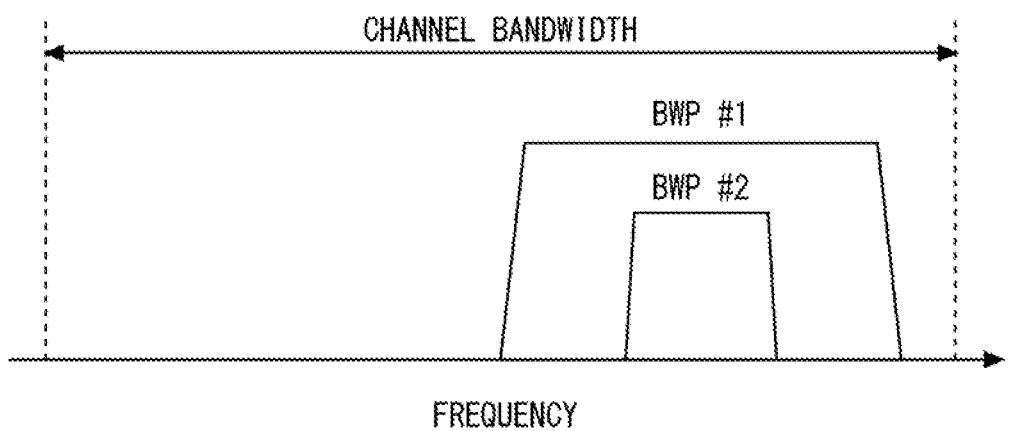
FIG. 7 is a diagram showing an example of use of Bandwidth parts (BWPs)
Figure 8:
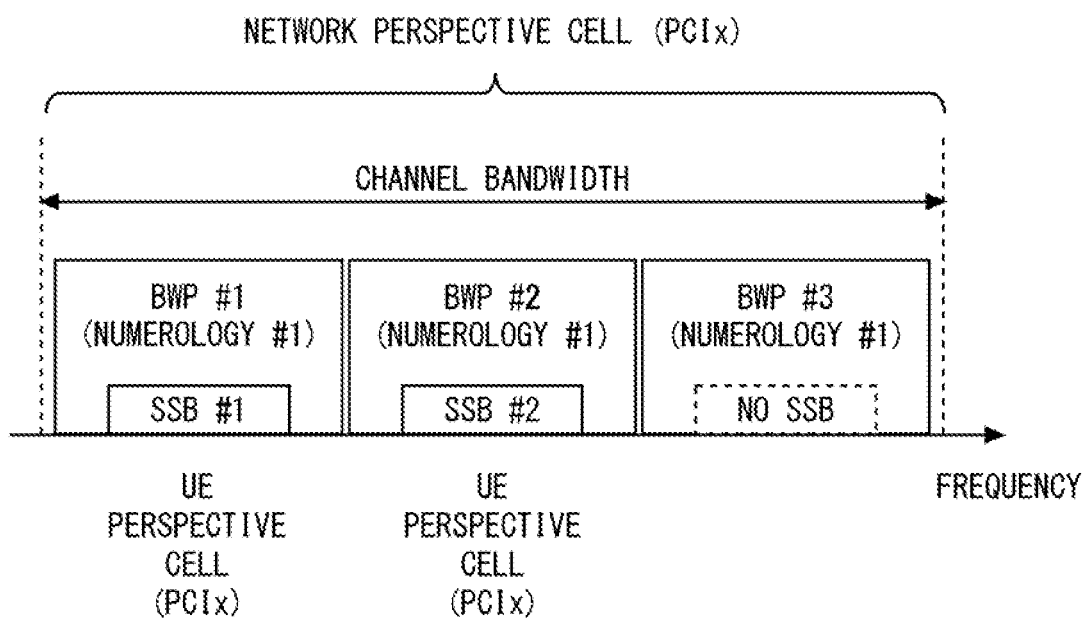
FIG. 8 is a diagram showing a configuration example of BWPs and SS/PBCH blocks.
Figure 9:
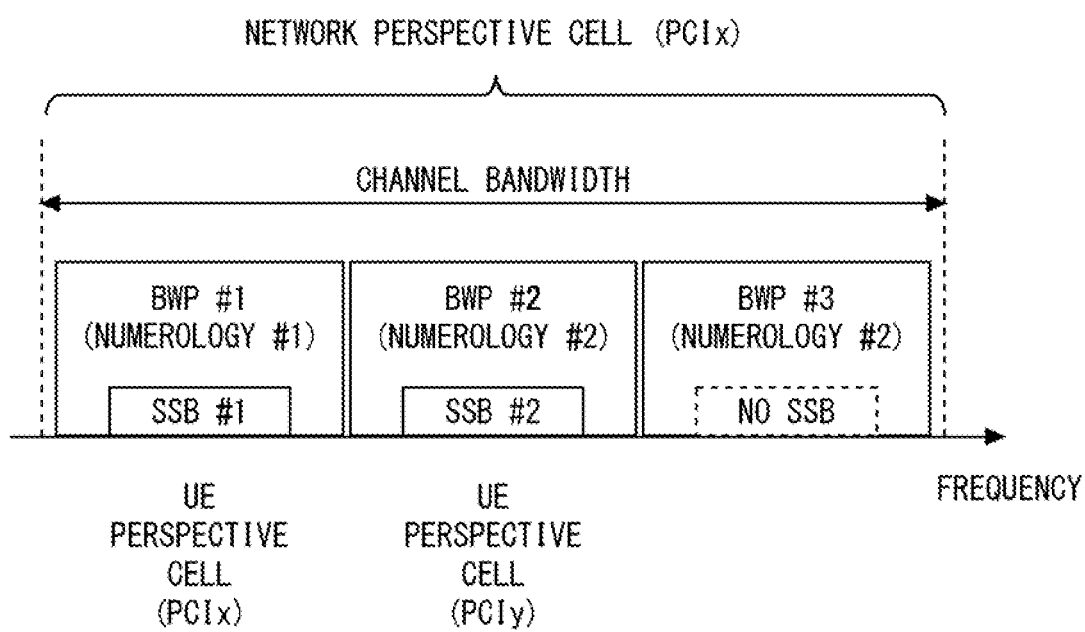
FIG. 9 is a diagram showing a configuration example of BWPs and SS/PBCH blocks.

First, the definition of terms used in cases where one system bandwidth includes multiple BWPs is described with reference to FIGS. 8 and 9. FIGS. 8 and 9 show configuration examples of BWPs and SS/PBCH blocks. In the examples shown in FIGS. 8 and 9, one channel bandwidth includes three BWPs: BWP #1, BWP #2 and BWP #3. BWP #1 and BWP #2 contain SS/PBCH block (SSB) #1 and SSB #2, respectively, while BWP #3 does not contain any SS/PBCH blocks.

From a network perspective, the entire bandwidth (i.e., channel bandwidth or system bandwidth) of one component carrier corresponds to one cell, just like in the existing LTE. In the examples of FIGS. 8 and 9, Physical Cell Identity (PCI) associated with a cell corresponding to the channel bandwidth is "PCIx".

In this specification, a cell from the network perspective is defined as a "logical cell." Further, a PCI associated with the cell from the network perspective (i.e., logical cell) is defined as a reference PCI. Note that, the cell from the network perspective (i.e., logical cell) may be associated with one Cell Identity. In this case, the Cell Identity of the cell from the network perspective (i.e., logical cell) may be associated with (sub-)PCIs of a plurality of physical cells, which are described later.

On the other hand, as described earlier, from a UE perspective, a cell is associated with one SS/PBCH block. In this specification, a cell from the UE perspective is defined as a "physical cell." Further, a PCI associated with the cell from the UE perspective (i.e., physical cell) is defined as a sub-PCI. Specifically, multiple BWPs that are included in the same system bandwidth and include their respective SS/PBCH blocks are multiple cells from the UE perspective (i.e., multiple physical cells). Sub-PCIs of these cells from the UE perspective (i.e., physical cells) are associated with one reference PCI or one Cell Identity of the cell from the network perspective (i.e., logical cell). Further, a BWP not including any SS/PBCH blocks may be defined as a cell from the UE perspective (i.e., physical cell), or a group of BWPs including a BWP without SS/PBCH block and a BWP with SS/PBCH block, which is referred to by the former one, may be defined as a cell from the UE perspective (i.e., physical cell). Note that, also in the network perspective, a unit system bandwidth that is actually used by the network (e.g., RAN node) for communication with the UE is each cell from the UE perspective (i.e., physical cell).

In the example of FIG. 8, the three BWPs support the same numerology (i.e., numerology #1), and all the SS/PBCH blocks (i.e., SSB #1 and SSB #2) within the channel bandwidth are based on NR-SS corresponding to the same (sub-)PCI (i.e., PCIx). Thus, FIG. 8 corresponds to the first scheme, which is described above in relation to transmission of multiple SS/PBCH blocks in one channel bandwidth. To synchronize with BWP #3 not containing any SSBs, the UE monitors one of SSB #1 and SSB #2 transmitted in other BWPs. SSB #1 or SSB #2 to be monitored is referred to as a reference SSB, and the UE may receive a notification of the identifier of the reference SSB (SSB index, e.g., SSB #1 or #2) from the network.

In the example of FIG. 9, BWP #1 supports numerology #1, while BWP #2 and BWP #3 support numerology #2. Different SSBs #1 and #2 with different numerologies are based on NR-SSs corresponding to different (sub-)PCIs (i.e., PCIx and PCIy). Thus, FIG. 9 corresponds to the second scheme, which is described above in relation to transmission of multiple SS/PBCH blocks in one channel bandwidth. To synchronize with BWP #3 not containing any SSBs, the UE monitors, for example, SSB #2 of BWP #2 that supports the same numerology as BWP #3. Alternatively, to synchronize with BWP #3 not containing any SSBs, the UE may monitor SSB #1 of BWP #1 that supports numerology different from that of BWP #3.

In the example of FIG. 8, sub-PCIs (i.e., PCIx and PCIx) of two cells from the UE perspective (i.e., physical cells) are associated with the reference PCI (i.e., PCIx) or Cell Identity of one cell from the network perspective (i.e., logical cell). Meanwhile, in the example of FIG. 9, sub-PCIs (i.e., PCIx and PCIy) of two cells from the UE perspective (i.e., physical cells) are associated with the reference PCI (i.e., PCIx) or Cell Identity of one cell from the network perspective (i.e., logical cell).

The network (e.g., RAN node) may configure the UE with a BWP set including one or more BWPs. In other words, the UE receives, from the network, configuration information of one or more BWPs (e.g., SSB indexes, presence of SSBs, reference SSB indexes, Layer-1 parameters). The BWP set may be configured individually for each of downlink (DL) and uplink (UL). Thus, the BWP set may include a DL BWP set for DL and an UL BWP set for UL. Alternatively, UL BWPs and DL BWPs may be associated in advance with each other, and in this case the BWP set may be common to DL and UL. The UE can activate k (k<=K) BWPs among K BWPs included in the (DL/UL) BWP set. Stated differently, for certain UE, up to K (DL/UL) BWP(s) can be activated at a time. In the following description, it is assumed for the sake of simplification that one BWP (i.e. k=1) is activated. Note that, however, this embodiment and the subsequent embodiments are applicable also to the cases where two or more (k>=2) BWPs are activated at a time.

Further, in this specification, the term "BWP group" is employed. A BWP group is contained in a BWP set. One BWP group consists of one or more BWPs among which the active BWP can be changed by DCI transmitted on a NR PDCCH. Among one or more BWPs included in the same BWP group, the active BWP can be changed without a change of the cell defining SSB. Thus, the BWP group may be defined as one or more BWPs associated with the same cell defining SSB. One BWP group may include one BWP containing the cell defining SSB (e.g., base BWP, initial BWP, or default BWP) and one or more other BWPs. Each of one or more other BWPs, which are not the base BWP (or initial BWP, default BWP), may or may not include a SSB. The UE may be explicitly informed (or may be configured as to) which SSB is the cell defining SSB. Alternatively, the UE may implicitly consider that the cell defining SSB is the SSB of the initial BWP when the UE has been configured with the BWP group.

The BWP group may be configured individually for each of downlink (DL) and uplink (UL). Thus, the BWP group may include a DL BWP group for DL and an UL BWP group for UL. Alternatively, UL BWPs and DL BWPs may be associated in advance with each other, and the BWP group in this case may be common to DL and UL.

In the example of FIG. 8, the UE is configured with one BWP set including BWP #1 to #3. In the example of FIG. 8, the UE may monitor SSB #1 transmitted in BWP #1 to synchronize with BWP #3 (i.e., to achieve synchronization in BWP #3). In this case, BWP #1 and BWP #3 may correspond to one BWP group, while BWP #2 may correspond to another one BWP group. Thus, one BWP set (BWPs #1, #2, and #3) may include a first BWP group (BWPs #1 and #3) and a second BWP group (BWP #2). Alternatively, one BWP set (BWPs #1, #2, and #3) may include a first BWP group (BWP #1) and a second BWP group (BWPs #2 and #3). Further alternatively, one BWP set (BWPs #1, #2, and #3) may correspond to one BWP group (BWPs #1, #2, and #3). In this case, one of SSB #1 and SSB #2 serves as the cell defining SSB for the UE.

In the example of FIG. 9 also, the UE is configured with one BWP set including BWP #1 to #3. In one example, BWP #1 with numerology #1 may correspond to one BWP group, while BWP #2 and BWP #3 with numerology #2 may correspond to another one BWP group. Thus, one BWP set (BWPs #1, #2, and #3) may include a first BWP group (BWP #1) and a second BWP group (BWPs #2 and #3). Note that, as described earlier, BWPs with different numerologies may be included in one BWP group. Thus, in another example, one BWP set (BWPs #1, #2, and #3) may include a first BWP group (BWPs #1 and #3) and a second BWP group (BWP #2). Further alternatively, one BWP set (BWPs #1, #2, and #3) may correspond to one BWP group (BWPs #1, #2, and #3). In this case, one of SSB #1 and SSB #2 serves as the cell defining SSB for the UE.

As described earlier, activation/deactivation of a BWP may be performed by a lower layer (e.g., Medium Access Control (MAC) layer, or Physical (PHY) layer), rather than by the RRC layer. A timer (e.g., BWP Inactivity Timer in the MAC layer) may be used for activation/deactivation of a DL BWP. The UE may switch the active BWP according to a timer based on a set value provided by the gNB. This timer may represent a period or duration in the unit of subframes. For example, when the UE transmit or receive no data for a predetermined period (i.e., expiration of the timer value) in the active BWP, it switches the active BWP to a predetermined BWP (e.g., default BWP, or BWP including the cell defining SSB). Such determination of the change of the active BWP based on the timer may be made also in the network (e.g., RAN node).

First Embodiment

Figure 10:
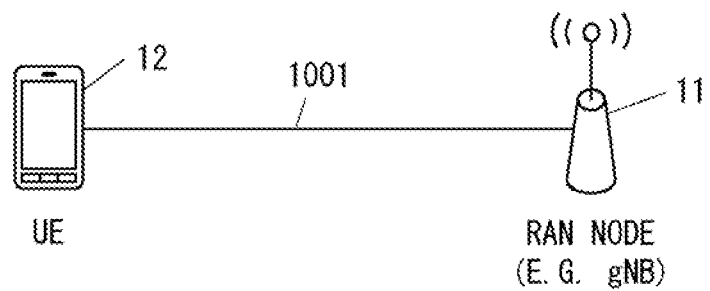
FIG. 10 is a diagram showing a configuration example of a radio communication network according to several embodiments.

FIG. 10 shows a configuration example of a radio communication network according to several embodiments including this embodiment. In the example of FIG. 10, the radio communication network includes a RAN node 11 and a radio terminal (UE) 12. The RAN node 11 is, for example, a gNB, or an eNB in MR-DC. The RAN node 11 may be a Central Unit (CU) (e.g., gNB-CU) or a Distributed Unit (DU) (e.g., gNB-DU) in the cloud RAN (C-RAN) deployment. The Central Unit (CU) is also referred to as a Baseband Unit (BBU) or a digital unit (DU). The Distributed Unit (DU) is also referred to as a Radio Unit (RU), a Remote Radio Head (RRH), a Remote Radio Equipment (RRE), or a Transmission and Reception Point (TRP or TRxP).

The UE 12 is connected to the RAN node 11 through an air interface 1001. The UE 12 may be simultaneously connected to a plurality of RAN nodes for dual connectivity. The UE 12 in connected mode can be semi-statically configured with one or more BWPs per cell. The UE 12 can switch its active BWP, used for communication with the RAN node 11 (e.g., MgNB) or another RAN node (e.g., SgNB), among the configured BWPs. This switching is done in a short time, e.g., several scheduling intervals.

The UE 12 performs an RLM procedure when it is in connected mode (e.g., NR RRC_CONNECTED). The UE 12 performs RLM measurements in the RLM procedure. Specifically, the UE 12 measures downlink radio quality of the serving cell for the purpose of detecting out-of-synchronization (out-of-sync) and detecting Radio Link Failure (RLF). The UE 12 may be simultaneously connected to a plurality of RAN nodes for dual connectivity. In this case, the UE 12 may perform RLM in the PCell and RLM in the PSCell simultaneously.

The radio quality may be, for example, RSRP, RSRQ, RSSI or SINR, or any combination thereof. Further, the 5G NR adopts a beam-based system where radio signals (data, control information, signaling, and RS) are beam-formed. Thus, in the measurement of the cell radio quality, the UE 12 first performs measurement (i.e., beam measurement) on an RS beam (e.g., beamformed RS, pre-coded RS) transmitted in a target cell (i.e., BWP) and obtains measurement results (beam level measurement results) on the RS beam. The beam level measurement results are also referred to as beam radio quality. The UE 12 then derives cell radio quality (cell measurement results) based on the beam level measurement results. Hereinafter, the terms "measurement for RLM (RLM measurement)", "measurement for RRM (RRM measurement)", or simply, "measurement" mean measuring or deriving at least one of the cell radio quality (cell quality) and the beam radio quality (beam quality) based on an RS type indicated by the RAN node or RS configuration information received from the RAN node. The measurement of the beam quality corresponding to RLM related to the cell quality is referred to as beam monitoring (BM) or beam link monitoring (BLM). Likewise, radio link quality deterioration based on the beam quality corresponding to RLF related to the cell quality is referred to as beam failure.

In the active BWP, at least the CSI-RS configured for RRM is transmitted. The active BWP may or may not contain the SS/PBCH block (SSB). In other words, the RAN node 11 may or may not transmit the NR-SS and the PBCH in the active BWP. The RAN node 11 indicates one RS type, either CSI-RS or SSB (i.e., NR-SS), to the UE 12 as the RS to be measured for RLM. Even when different types of RS (i.e., CSI-RS and SSB) are simultaneously transmitted in one BWP, only one RS type is selected for RLM, and a measurement configuration (measurement parameters) related to this selected RS type is used for RLM. The measurement configuration related to the selected RS type may include, for example, parameters equivalent to the thresholds "$Q_{in}$" and "$Q_{out}$" defined in 3GPP standards TS 36.213 and TS 36.133. In this case, different parameters equivalent to the thresholds "$Q_{in}$" and "$Q_{out}$" may be configured for different RS types.

The RAN node 11 provides RLM configuration to the UE 12. The RLM configuration includes measurement configuration (measurement parameters) for RLM. The measurement configuration (measurement parameters) for RLM includes, for example, a specified number of out-of-sync (e.g. N310 for PCell, N313 for PSCell), a specified number of in-sync (e.g. N311 for PCell, N314 for PSCell), and an expiration time (maximum time) of an RLF timer (e.g. T310 for PCell, T313 for PSCell. The specified number of out-of-sync is the number of consecutive "out-of-sync" indications received from lower layers before the UE initiates the radio link self-recovery process. The specified number of in-sync is the number of consecutive "in-sync" indications received from lower layers before the UE determines that the radio link has recovered. The RLF timer is used to determine (or detect) RLF. The UE (e.g., RRC layer) starts the RLF timer upon receiving the specified number of consecutive out-of-sync (OOS) indications from lower layers, and stops the RLF timer upon receiving the specified number of consecutive in-sync (IS) indications. The expiration time (maximum time) of the RLF timer is equivalent to the maximum time allowed for the recovery of the radio link which is made dynamically by the UE. In response to the expiration of the RLF timer, the UE detects RLF.

In the RLM procedure, the UE 12 may assess the radio link quality per radio frame. In this case, the UE 12 may select, per radio frame for which the radio link quality is assessed, the RS type (e.g. CSI-RS or SS/PBCH block) to be used for RLM. Alternatively the UE 12 may select, per subframe, per slot, per OFDM symbol, or per TTI (rather than per radio frame), the RS type to be used for evaluation of the radio link quality and RLM.

When the DL active BWP is changed from a first BWP to a second BWP without a change of the cell defining SSB, the UE 12 behaves as follows with regard to RLM measurements. If the RS type for RLM of the first BWP received by the UE 12 is set to an SSB type (i.e. NR-SS), the UE 12 continues to monitor a first SSB associated with the first BWP in order for RLM measurements even after switching of the DL BWP to the second BWP. Stated differently, even if the second BWP includes an SSB, the UE 12 does not use this SSB in the second BWP for performing RLM measurements when SSB-based RLM measurements are indicated to the UE 12. In this case, the UE 12 may not perform measurement on the SSB in the second BWP, or it may measure this for RRM. Here and hereinafter, the timing indicated by the expression "when something is changed" may be radio-frame-level timing, subframe-level timing, slot-level timing, or OFDM-symbol-level timing.

The first SSB may be the cell defining SSB associated with the first BWP. The first SSB may be included in the first BWP, or it may be included in another BWP.

The UE 12 may inherit and use the measurement configuration (e.g., Measurement Object) for RLM used before switching the active BWP, in order to continue using the first SSB for RLM measurements. Further, the UE 12 may also inherit and use the value (or status) of an RLM-related parameter used before switching the active BWP. In other words, the UE 12 may continue the measurement of the first SSB for RLM based on the measurement configuration and the parameter (status) for RLM used before switching the active BWP. In still other words, the UE 12 may assume (consider) that the measurement configuration and the parameter (status) for RLM before the active BWP switching are also used after the active BWP switching.

The RLM-related parameter includes, for example, the count value of consecutive out-of-sync indications, the count value of consecutive in-sync indications, and the value of the RLF timer. The RLM-related parameter may include an in-sync threshold and an out-of-sync threshold. The UE 12 compares estimated DL radio link quality with the in-sync threshold and the out-of-sync threshold in order for radio link monitoring (RLM). Each of the in-sync threshold and the out-of-sync threshold is for example an RSRP threshold, and it is represented in terms of the Block Error Rate (BLER) of a hypothetical PDCCH transmission from the serving cell. Specifically, for example, the out-of-sync threshold is defined as a level corresponding to 10% BLER of a hypothetical PDCCH transmission in consideration of transmission parameters for out-of-sync and errors in a Physical Control Format Indicator Channel (PCFICH). On the other hand, the in-sync threshold is defined as a level corresponding to 2% BLER of a hypothetical PDCCH transmission in consideration of transmission parameters for in-sync and errors in a Physical Control Format Indicator Channel (PCFICH).

As described above, the measurement configuration for RLM may include, for example, a specified number of out-of-sync, a specified number of in-sync, and the expiration time (maximum time) of the RLF timer. The measurement configuration for RLM may further include PDCCH/PCFICH transmission parameters for out-of-sync and PDCCH/PCFICH transmission parameters for in-sync. The PDCCH/PCFICH transmission parameters may include, for example, a DCI format, the number of control OFDM symbols, an aggregation level, a ratio of PDCCH RE energy to the average RS Resource Element (RE) energy, and the ratio of PCFICH RE energy to average RS Resource Element (RE) energy. The RS RE energy, the PDCCH RE energy, and the PCFICH RE energy indicate the energy of the RS per RE, the energy of the PDCCH per RE, and the energy of the PCFICH per RE, respectively. These PDCCH/PCFICH transmission parameters may be configured per BWP, per SSB, or per CSI-RS. Additionally or alternatively, these PDCCH/PCFICH transmission parameters may be configured and used per radio frame, per subframe, per slot, per OFDM symbol, or per TTI.

Figure 11:
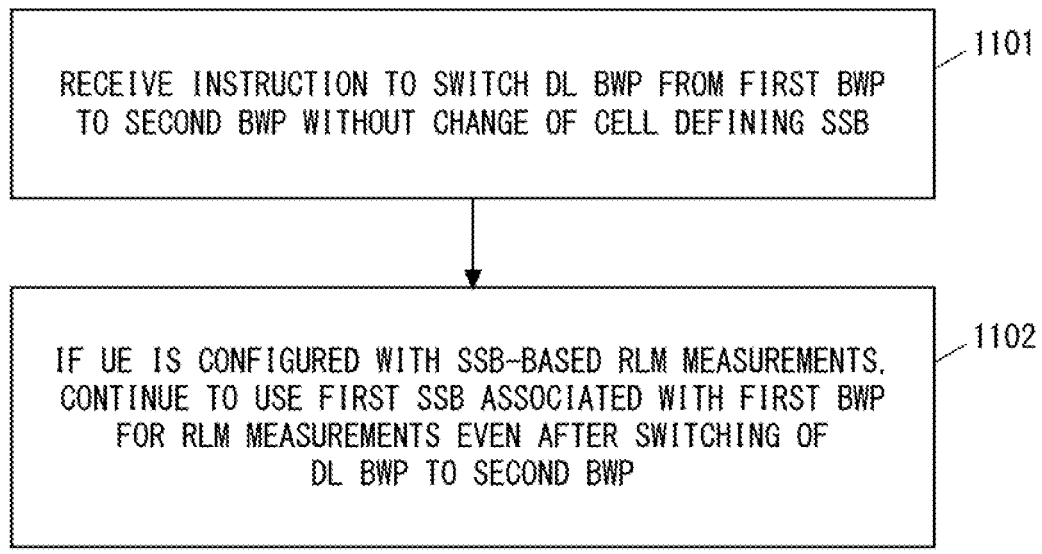
FIG. 11 is a flowchart showing an example of an operation of a radio terminal according to a first embodiment.

FIG. 11 is a flowchart showing a process 1100, which is an example of an operation related to RLM performed by the UE 12. In Step 1101, the UE 12 receives, from the RAN node 11, an instruction to switch the DL active BWP from the first BWP to the second BWP without a change of the cell defining SSB. For example, this instruction may indicate activation of the second BWP and may further indicate deactivation of the first BWP. As described earlier, BWP activation/deactivation is made by, for example, a DCI (e.g., scheduling DCI) transmitted on an NR PDCCH.

In Step 1102, the UE 12 determines which RS type is used for RLM of the first BWP before switching of the DL active BWP. If the UE 12 is configured with SSB-based RLM measurements, the UE 12 continues the RLM measurements in the first SSB associated with the first BWP even after switching of the DL active BWP to the second BWP. In other words, if the UE 12 has received the RS type for RLM of the first BWP set to the SSB type (i.e. NR-SS), the UE 12 continues measurement on the first SSB associated with the first BWP in order for RLM. Further, the UE 12 may use this measurement and measurement results as measurement and measurement results for RRM of an adjacent cell (or an adjacent BWP).

As is understood from the above description, if the UE 12 is configured with SSB-based RLM measurements for the first BWP, the UE 12 operates as follows when the DL active BWP is changed from the first BWP to the second BWP without a change of the cell defining SSB. In other words, if the RS type of RLM measurements for the first BWP received by the UE 12 is set to SSB (i.e. NR-SS), the UE 12 operates as follows when the DL active BWP is switched from the first BWP to the second BWP by the NR PDCCH/DCI. Specifically, the UE 12 continues measurement on the first SSB associated with the first BWP in order for RLM even after switching of the DL BWP to the second BWP. The first SSB may be a cell defining SSB associated with the first BWP. The first SSB may be included in the first BWP or another BWP. The UE 12 can thereby continue RLM based on the same first SSB even after switching of the DL active BWP.

The UE 12 does not change the RS (e.g., the first SSB) to be used for RLM measurements before and after the DL active BWP switching without a change of the cell defining SSB, the UE 12 can thus continuously measure the cell radio quality. For example, the UE 12 can stably measure the cell radio quality even when the active BWP is switched dynamically in the BWP group, thereby appropriately understanding (detecting) the deterioration or improvement of the radio quality. Therefore, this control method is particularly effective for operations where the active BWP is switched at relatively short time intervals.

On the other hand, if the UE 12 is configured with CSI-RS-based RLM measurements, the UE 12 may operate as follows when the DL active BWP is changed from the first BWP to the second BWP without a change of the cell defining SSB. In other words, if the RS type for RLM received by the UE 12 is set to CSI-RS, the UE 12 may operate as follows when the DL active BWP is switched from the first BWP to the second BWP by an NR PDCCH/DCI. Specifically, the UE 12 may perform RLM measurements on a second CSI-RS in the second BWP, instead of a first CSI-RS in the first BWP. While the UE 12 changes the CSI-RS to be used for RLM, it may inherit and use the value (or status) of the RLM-related parameter used before active BWP switching. The RLM-related parameter may include the count value of consecutive out-of-sync indications, the count value of consecutive in-sync indications, and the value of the RLF timer as described above. The RLM-related parameter may include the in-sync threshold and the out-of-sync threshold. Further, while the UE 12 changes the CSI-RS to be used for RLM, it may inherit and use at least part of the measurement configuration for RLM used before active BWP switching. The measurement configuration for RLM may include a specified number of out-of-sync, a specified number of in-sync, and the expiration time (maximum time) of the RLF timer as described above. Further, the measurement configuration for RLM may include PDCCH/PCFICH transmission parameters.

Figure 12:
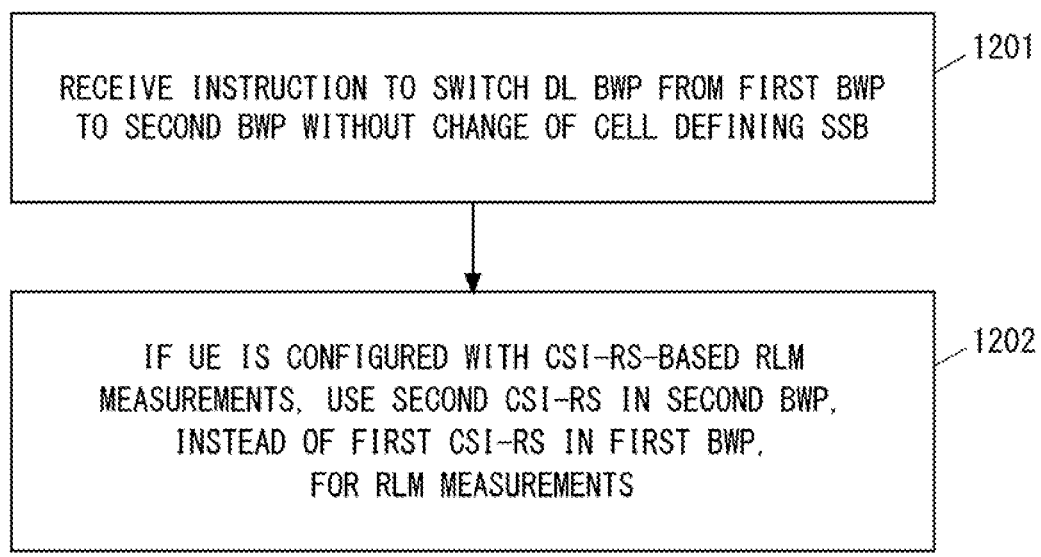
FIG. 12 is a flowchart showing an example of an operation of a radio terminal according to the first embodiment.

FIG. 12 is a flowchart showing a process 1200, which is another example of an operation related to RLM performed by the UE 12. Processing in Step 1201 is similar to processing in Step 1101. In Step 1202, the UE 12 determines which RS type is used for RLM of the first BWP before DL active BWP switching. If the UE 12 is configured with CSI-RS-based RLM measurements, the UE 12 uses the second CSI-RS transmitted in the second BWP, instead of the first CSI-RS transmitted in the first BWP, for the RLM measurements after switching of the DL active BWP to the second BWP. Thus, the UE 12 performs RLM measurements on the second CSI-RS.

Upon DL active BWP switching, by changing the RS (e.g., CSI-RS) to be used for RLM to the RS transmitted in the DL active BWP after switching, the UE 12 can perform RLM based on the radio quality of the serving cell (active BWP). For example, when the active BWP is switched semi-statically in the BWP group, the UE 12 can appropriately measure the radio quality of the cell that is actually being used, thereby appropriately understanding (detecting) the deterioration or improvement of the radio quality. Thus, this control method is particularly effective for operations where the active BWP is switched at relatively long time intervals.

As is understood from the above description, in some implementations, the UE 12 may operate as follows when the DL active BWP is changed from the first BWP to the second BWP without a change of the cell defining SSB. Specifically, the UE 12 determines whether to change the reference signal (RS) to be monitored for RLM after switching of the DL active BWP depending on which of the SSB-based and the CSI-RS-based RLM measurements are configured for the first BWP. In other words, the UE 12 determines whether to change the RS to be used for RLM measurements after switching of the DL active BWP depending on whether the RS type for RLM is the SSB type or the CSI-RS type. Thus, when the UE 12 receives on an NR PDCCH an instruction (DCI) to switch the DL active BWP in the BWP group, the UE 12 can appropriately change the RS to be used for RLM measurements without receiving an RRC message (e.g., RRC Reconfiguration). Stated differently, the RAN node 11 only needs to transmit an NR PDCCH, without transmitting an RRC message, to cause the UE 12 to select the RS to be used for RLM measurements. This can reduce the amount of radio signals (RRC signaling) and reduce delay in changing the RRC layer configuration in the UE 12.

Figure 13:
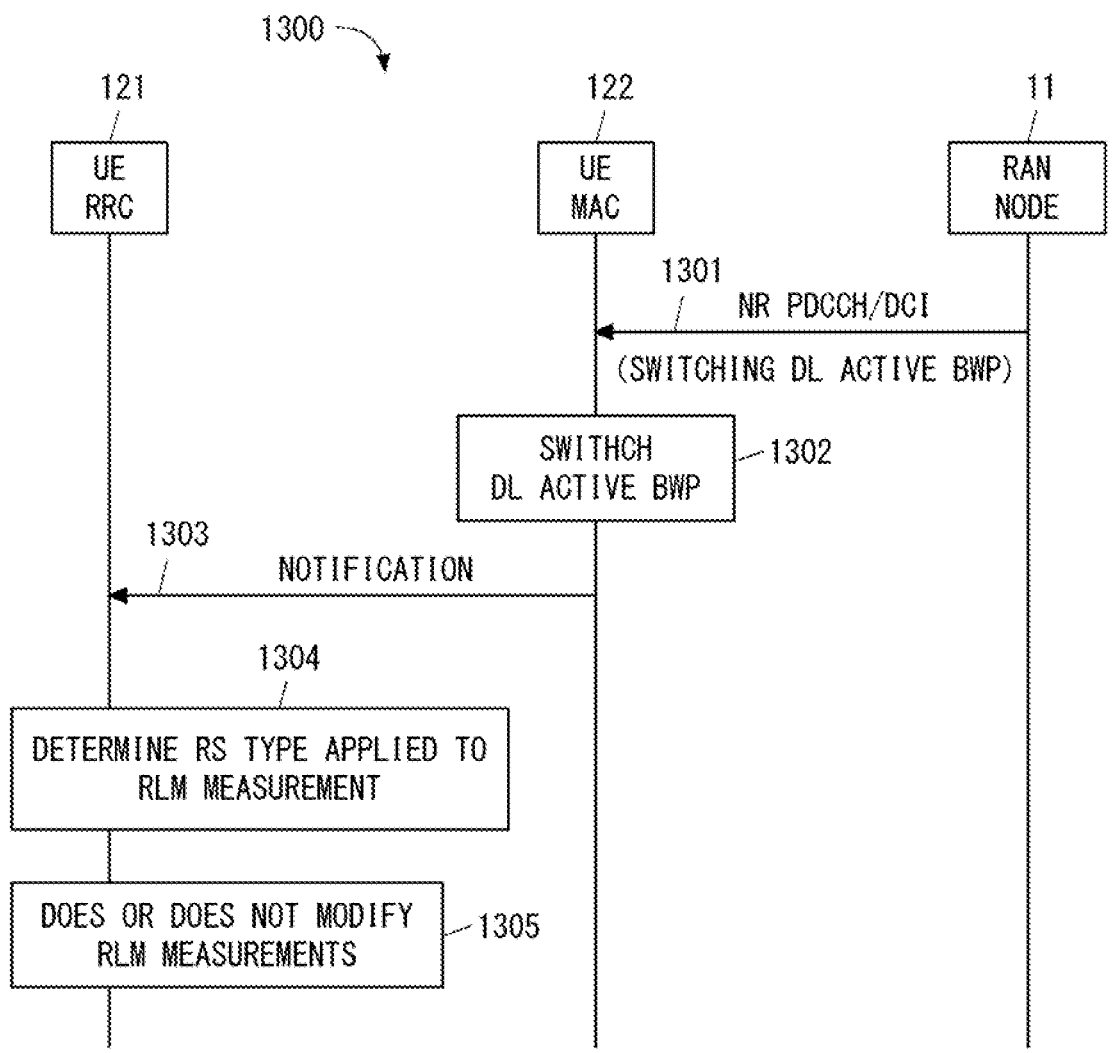
FIG. 13 is a sequence diagram showing an example of operations of a radio terminal and a RAN node according to the first embodiment.

FIG. 13 is a sequence diagram showing a process 1300, which is an example of operations of the RAN node 11 and the UE 12 according to this embodiment. A UE RRC layer 121 and a UE MAC layer 122 are included in the control-plane protocol stack of the UE 12. The UE RRC layer 121 is a lower layer of a UE NAS layer (not shown), and it provides radio resource control (RRC) and manages RRC status (e.g., NR RRC_IDLE and NR RRC_CONNECTED) of the UE 12. The RRC status indicates, for example, whether a radio connection (RRC connection) between the UE 12 and the RAN node 11 is established or not.

The UE RRC layer 121 receives one or more BWP configurations for each component carrier from the RAN node 11. For example, the RAN node 11 transmits to the UE RRC layer 121, via an RRC Reconfiguration message, one or more BWP-related control information items (BWP configurations) for each component carrier. The one or more BWP configurations for each component carrier may contain, for example, at least one of the following information elements (IEs):

Information element indicating one or more BWP indices associated with one or more downlink BWPs;

Information element indicating one or more BWP indices associated with one or more uplink BWPs;

Information element indicating a carrier frequency (e.g., Absolute Radio Frequency Channel Number (ARFCN)) associated with each BWP;

Information element indicating whether each BWP contains an SS/PBCH block (SSB);

Information element indicating a reference SSB associated with a BWP not containing an SSB, or indicating a reference BWP including this reference SSB;

Information element indicating the structure of an SSB transmitted in each BWP (e.g., SS sequence or PCI, SSB duration, numerology);

Information element indicating an offset to the lowest PRB of each SSB from the reference PRB (e.g., PRB0);

Information element indicating numerology configured for each BWP; and

Information element indicating the structure of a BWP set or a BWP group (e.g., information about an index of each BWP group and a list of BWP indices included therein).

Further, the UE RRC layer 121 receives from the RAN node 11 a measurement configuration (MeasConfig) for RLM of each serving cell. For example, the RAN node 11 transmits the measurement configuration for RLM of each serving cell to the UE RRC layer 121 via an RRC Reconfiguration message. The measurement configuration includes a measurement configuration for RLM (e.g., RS type).

Further, the measurement configuration for RLM of each serving cell may include the above-described measurement configuration for RLM. One or more Measurement configurations (a set of measurement parameters) for RLM may be included in the corresponding one or more BWP configurations. Alternatively, the measurement configuration for RLM of each serving cell may be included in a DCI transmitted on an NR PDCCH, or in a MAC CE.

The UE MAC layer 122 determines activation/deactivation of one or more BWPs configured in the UE 12. As described above, switching of BWPs in the BWP group is made by, for example, a DCI transmitted on an NR PDCCH. Further, in this case, deactivation of the active BWP before switching and activation of the active BWP after switching may be done by this DCI.

In Step 1301, the RAN node 11 transmits a DCI for switching of the DL active BWP to the UE 12 on an NR PDCCH. This DCI triggers the UE 12 to switch the DL active BWP. In Step 1302, the UE MAC layer 122 switches the DL active BWP in response to receiving this DCI from the RAN node 11. In Step 1303, the UE MAC layer 122 notifies the UE RRC layer 121 of switching of the DL active BWP. The notification in Step 1303 may be made before Step 1302.

In Step 1304, in response to receiving the notification indicating switching of the DL active BWP from the lower layer (the MAC layer 122), the UE RRC layer 121 determines the RS type applied to the DL active BWP before switching. In other words, the UE RRC layer 121 determines whether the RS type used for RLM is the SSB type or the CSI-RS type.

In Step 1305, the UE RRC layer 121 modifies RLM measurements depending on which of the SSB type and the CSI-RS type has been applied to the DL active BWP before switching. Specifically, if the RS type for RLM that has been applied to the DL active BWP before switching is the SSB type, the UE RRC layer 121 does not change the reference signal (i.e., SSB) to be used for RLM measurements after DL active BWP switching. Thus, the UE RRC layer 121 continuously performs RLM based on the same SSB. On the other hand, if the RS type for RLM that has been applied to the DL active BWP before switching is the CSI-RS type, the UE RRC layer 121 performs RLM based on the CSI-RS included in the DL active BWP after switching.

Note that, in this embodiment, the UE 12 may perform CSI measurements in addition to RLM measurements. The CSI measurements include measuring the DL radio quality of the serving cell when the UE 12 is in a connected mode (e.g., NR RRC_CONNECTED) for the purpose of transmitting to the RAN node 11 a report containing a Channel Quality Indicator (CQI) to be used for at least one of scheduling and link adaptation. When the DL active BWP is switched from the first BWP to the second BWP without a change of the cell defining SSB, the UE 12 may monitor the second CSI-RS in the second BWP for CSI measurements, instead of the first CSI-RS in the first BWP.

Further, in the above-described example, the UE MAC layer 122 notifies the UE RRC layer 121 of switching of the DL active BWP in response to receiving a DCI for DL active BWP switching via an NR PDCCH. However, instead of the UE MAC layer 122, the UE PHY layer that has received this DCI may send this notification directly to the UE RRC layer 121 (and the UE MAC layer 122).

Second Embodiment

This embodiment provides an example of RLM measurements performed by a UE when the DL active BWP is switched with a change of the cell defining SSB. A configuration example of a radio communication network according to this embodiment is similar to that shown in FIG. 10.

In this embodiment, when the DL active BWP is changed from the first BWP to the second BWP with a change of the cell defining SSB, the UE 12 behaves as follows with regard to RLM measurements. If the RS type for RLM of the first BWP is set to the SSB type, the UE 12 discontinues (or suspends) using a first SSB associated with the first BWP for RLM measurements. Thus, the UE 12 discontinues (or suspends) RLM based on the first SSB. Additionally or alternatively, if the RS type for RLM of the first BWP is set to the SSB type, the UE 12 may use a second SSB associated with the second BWP, instead of the first SSB associated with the first BWP, for RLM measurements.

Further, when discontinuing (or suspending) using the first SSB associated with the first BWP for RLM measurements, the UE 12 may reset the value (or status) of the RLM-related parameter used before DL active BWP switching to a default value (e.g., zero) or a set value (e.g., expiration value). The RLM-related parameter may include the count value of consecutive out-of-sync indications, the count value of consecutive in-sync indications, and the value of an RLF timer.

When the SSB is used for RLM as in this embodiment, there is a possibility that the DL radio quality is significantly different among physical cells (BWPs) that are included in a single logical cell but have different cell defining SSBs from each other. For example, when physical cells (BWPs) having different cell defining SSBs from each other are used in a single logical cell, there is a possibility that the frequency characteristics are significantly different among these physical cells (BWPs) because the logical cell has a wider bandwidth (e.g., 400 MHz). Alternatively, there is a possibility that the radio propagation characteristics are significantly different among the physical cells (BWPs) due to application of different numerologies (e.g., Subcarrier spacing) to these physical cells (BWPs). In other words, there is a possibility that the received quality at the UE 12 of the cell defining SSB after switching of the DL active BWP is significantly different from that of the cell defining SSB before the switching. Thus, it is expected that RLM after switching of the DL active BWP is not optimum unless the UE 12 changes the SSB to be used for RLM before and after switching of the DL active BWP involving a change of the cell defining SSB. Accordingly, the UE 12 operates as described above, thereby optimizing RLM after switching of the DL active BWP.

Alternatively, when discontinuing (or suspending) monitoring of the SSB for RLM measurements, the UE 12 may maintain (retain) the value (or status) of the RLM-related parameter used before switching of the DL active BWP without resetting them. Then, the UE 12 may use the maintained (retained) value of the RLM-related parameter when starting RLM measurements in the second SSB associated with the second BWP after switching. This is effective when the frequency characteristics or the propagation characteristics of the DL active BWPs before and after switching are the same or similar regardless of a change of the cell defining SSB. The RAN node 11 may transmit, to the UE 12, information indicating whether to reset the value of the RLM-related parameter (or whether to maintain the value (or status) of the RLM-related parameter) upon switching of the DL active BWP with a change of the cell defining SSB. This information may be transmitted from the RAN node 11 to the UE 12 together with an instruction for switching of the DL active BWP.

Figure 14:
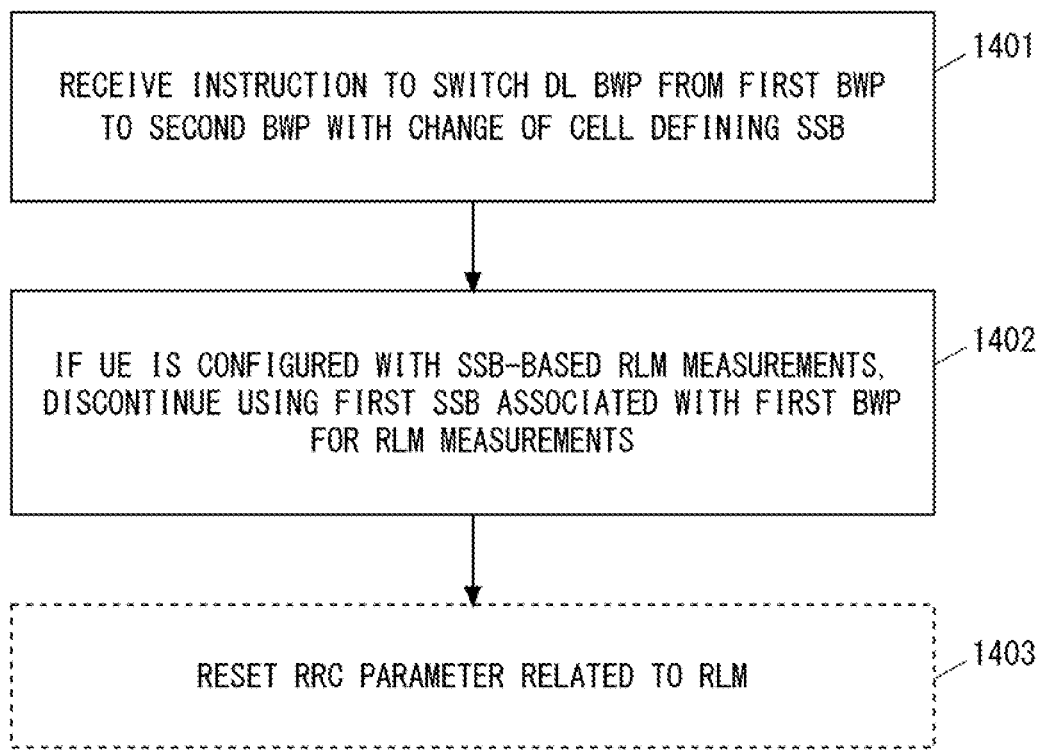
FIG. 14 is a flowchart showing an example of an operation of a radio terminal according to a second embodiment.

FIG. 14 is a flowchart showing a process 1400, which is an example of an operation related to RLM performed by the UE 12. In Step 1401, the UE 12 receives, from the RAN node 11, an instruction to switch the DL active BWP from the first BWP to the second BWP with a change of the cell defining SSB. For example, this instruction may indicate activation of the second BWP and may further indicate deactivation of the first BWP. Since the cell defining SSB needs to be changed, this instruction may be sent from the RAN node 11 to the UE 12 via RRC signaling (e.g., RRC Reconfiguration message).

In Step 1402, if the UE 12 is configured with SSB-based RLM measurements, the UE 12 stops RLM based on the first SSB associated with the first BWP. In Step 1403, the UE 12 resets the value (or status) of the RLM-related parameter used before DL active BWP switching to a default value (e.g., zero) or a set value (e.g., expiration value). Step 1403 is not necessarily performed.

Figure 15:
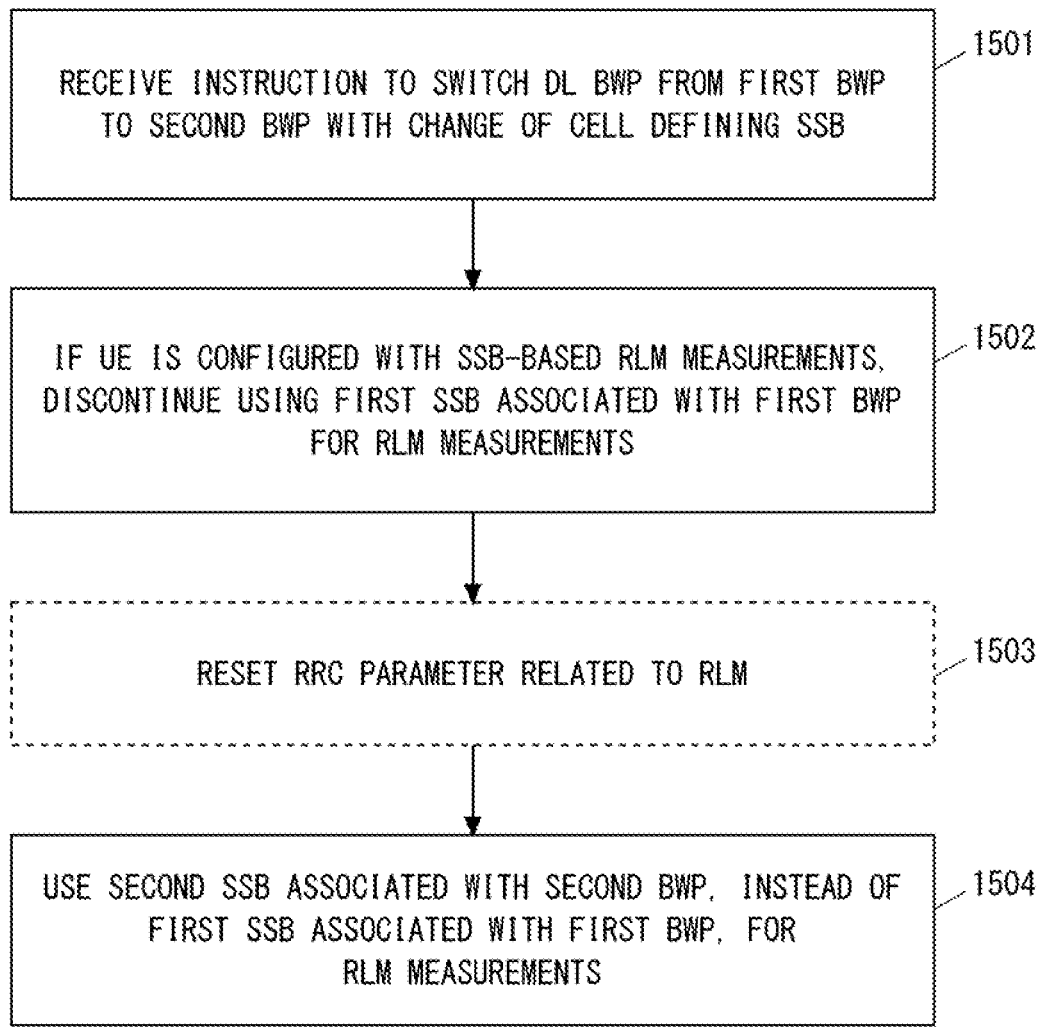
FIG. 15 is a flowchart showing an example of an operation of a radio terminal according to the second embodiment.

FIG. 15 is a flowchart showing a process 1500, which is another example of an operation related to RLM performed by the UE 12. Processing performed in Steps 1501 to 1503 is similar to processing in Steps 1401 to 1403.

In Step 1504, if the UE 12 is configured with SSB-based RLM measurements, the UE 12 starts RLM based on the second SSB associated with the second BWP, instead of the first SSB associated with the first BWP.

On the other hand, if the RS type for RLM is set to the CSI-RS type, the UE 12 may operate as follows when the DL active BWP is changed from the first BWP to the second BWP, regardless of whether there is a change of the cell defining SSB or not. Specifically, the UE 12 may use the second CSI-RS in the second BWP, instead of the first CSI-RS in the first BWP, for RLM measurements. While the UE 12 changes the CSI-RS to be used for RLM, it may inherit and use the value (or status) of the RLM-related parameter used before DL active BWP switching. The RLM-related parameter may include the count value of consecutive out-of-sync indications, the count value of consecutive in-sync indications, and the value of the RLF timer as described above. The RLM-related parameter may include the in-sync threshold and the out-of-sync threshold.

Figure 16:
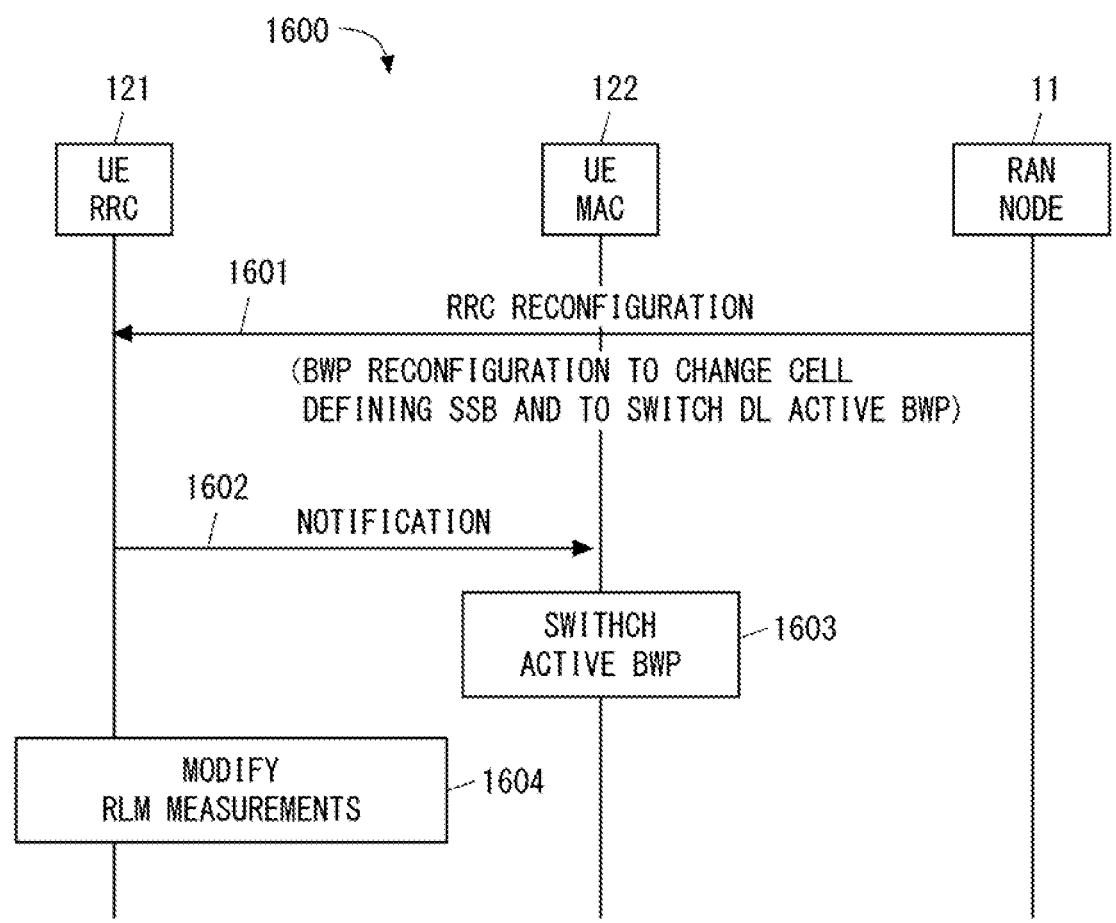
FIG. 16 is a sequence diagram showing an example of operations of a radio terminal and a RAN node according to a second embodiment.

FIG. 16 is a sequence diagram showing a process 1600, which is an example of operations of the RAN node 11 and the UE 12 according to this embodiment. The UE RRC layer 121 and the UE MAC layer 122 are included in the control-plane protocol stack of the UE 12.

In Step 1601, the RAN node 11 transmits an RRC Reconfiguration message for BWP reconfiguration to the UE 12 (the UE RRC layer 121). This BWP reconfiguration triggers the UE 12 to change the cell defining SSB and switch the DL active BWP.

In Step 1602, the UE RRC layer 121 instructs the UE MAC layer 122 to switch the DL active BWP. In Step 1603, the UE MAC layer 122 switches the DL active BWP in accordance with the instruction from the UE RRC layer 121. In this case, the UE RRC layer 121 or the UE MAC layer 122 may instruct the UE PHY layer (not shown) to switch the DL active BWP, and the UE PHY layer may adjust its radio processing unit (e.g., RF) to receive the DL active BWP after switching in accordance with the instruction.

In Step 1604, the UR RRC 121 modifies RLM measurements depending on the change of the cell defining SSB and the switching of the DL active BWP. Specifically, if the RS type for RLM applied to the DL active BWP before switching is the SSB type (i.e., NR-SS), the UE RRC layer 121 uses the SSB associated with the BWP after switching, instead of the SSB associated with the DL active BWP before switching, for RLM measurements. On the other hand, if the RS type for RLM applied to the DL active BWP before switching is the CSI-RS type, the UE RRC layer 121 uses the CSI-RS included in the DL active BWP after switching for RLM measurements.

Note that the UE 12 according to this embodiment may further perform the operations related to RLM of the UE upon switching of the DL active BWP without a change of the cell defining SSB, which is described in the first embodiment. In other words, the UE 12 may determine whether to continue using the first SSB associated with the first BWP for RLM measurements depending on whether switching of the (DL) active BWP from the first BWP to the second BWP involves a change of the cell defining SSB. The UE 12 can thus appropriately understand not only the radio quality in the (DL) BWP corresponding to the camping physical cell (serving cell) but also the radio quality in the (DL) BWP including the cell defining SSB (i.e., the (DL) BWP in which this SSB is transmitted). As described above, the DL BWP including the cell defining SSB is the DL BWP that represents one out of one or more physical cells included in the logical cell. Thus, by understanding the radio quality of the (DL) BWP including the cell defining SSB, the UE 12 can determine whether this physical cell is suitable to stay in. Further, the (DL) BWP including the cell defining SSB can be regarded as the (DL) BWP that represents all the BWPs included in the same logical cell when another (DL) BWP including the cell defining SSB does not exist (or is not configured) in the same logical cell. Thus, by understanding the radio quality of the (DL) BWP including the cell defining SSB, the UE 12 can appropriately determine whether this logical cell is suitable to stay in.

Further, in this embodiment, the UE 12 may perform CSI measurements in addition to RLM measurements. When the DL active BWP is switched from the first BWP to the second BWP with a change of the cell defining SSB, the UE 12 may monitor the second CSI-RS in the second BWP, instead of the first CSI-RS in the first BWP, for CSI measurements.

Third Embodiment

This embodiment provides a method for measurement configuration in order to deal with switching of the active BWP among multiple BWPs included in one BWP group. A configuration example of a radio communication network according to this embodiment is similar to that shown in FIG. 10. A method described in this embodiment can be used for the RLM measurements, RRM measurements, and CSI measurements described in the first and second embodiments.

In this embodiment, in order to deal with switching of the active BWP (not involving a change of the cell defining SSB) among multiple DL BWPs included in one DL BWP group, the RAN node 11 provides the UE 12, in advance, via RRC signaling (e.g., a RRC Reconfiguration message), with a measurement configuration which enables to replace (swap) the relationship between the serving cell (serving BWP, active BWP) and the neighbor cell (non-serving BWP, neighbor BWP). Upon switching of the active BWP among BWPs within the BWP group for communication between the UE 12 and the RAN, the UE 12 uses the previously received measurement configuration by replacing the relationship between the serving cell (serving BWP, active BWP) and the neighbor cell (non-serving BWP, neighbor BWP).

For example, when one BWP group includes first and second BWPs, the RAN node 11 provides the UE 12, via RRC signaling (e.g., RRC Reconfiguration message), with the measurement configuration corresponding to the situation where the first BWP is the serving cell (serving BWP) and the second BWP is the neighbor cell (neighbor BWP, non-serving BWP). When the active BWP is the first BWP, the UE 12 performs measurements (e.g., RLM measurement, RRM measurement, CSI measurement) in accordance with this measurement configuration. Further, upon switching of the active BWP from the first BWP to the second BWP, the UE 12 uses the already received measurement configuration by replacing the relationship between the serving cell (serving BWP) and the neighbor cell (neighbor BWP, non-serving BWP) in this measurement configuration.

The RAN node 11 and the UE 12 according to this embodiment do not need RRC signaling for updating the measurement configuration when switching the active BWP within the BWP group. Thus, the RAN node 11 and the UE 12 according to this embodiment can quickly update the measurement configuration in response to switching of the active BWP within the BWP group, and accordingly can quickly start the measurement operation in accordance with the measurement configuration corresponding to the active BWP after switching.

Figure 17:
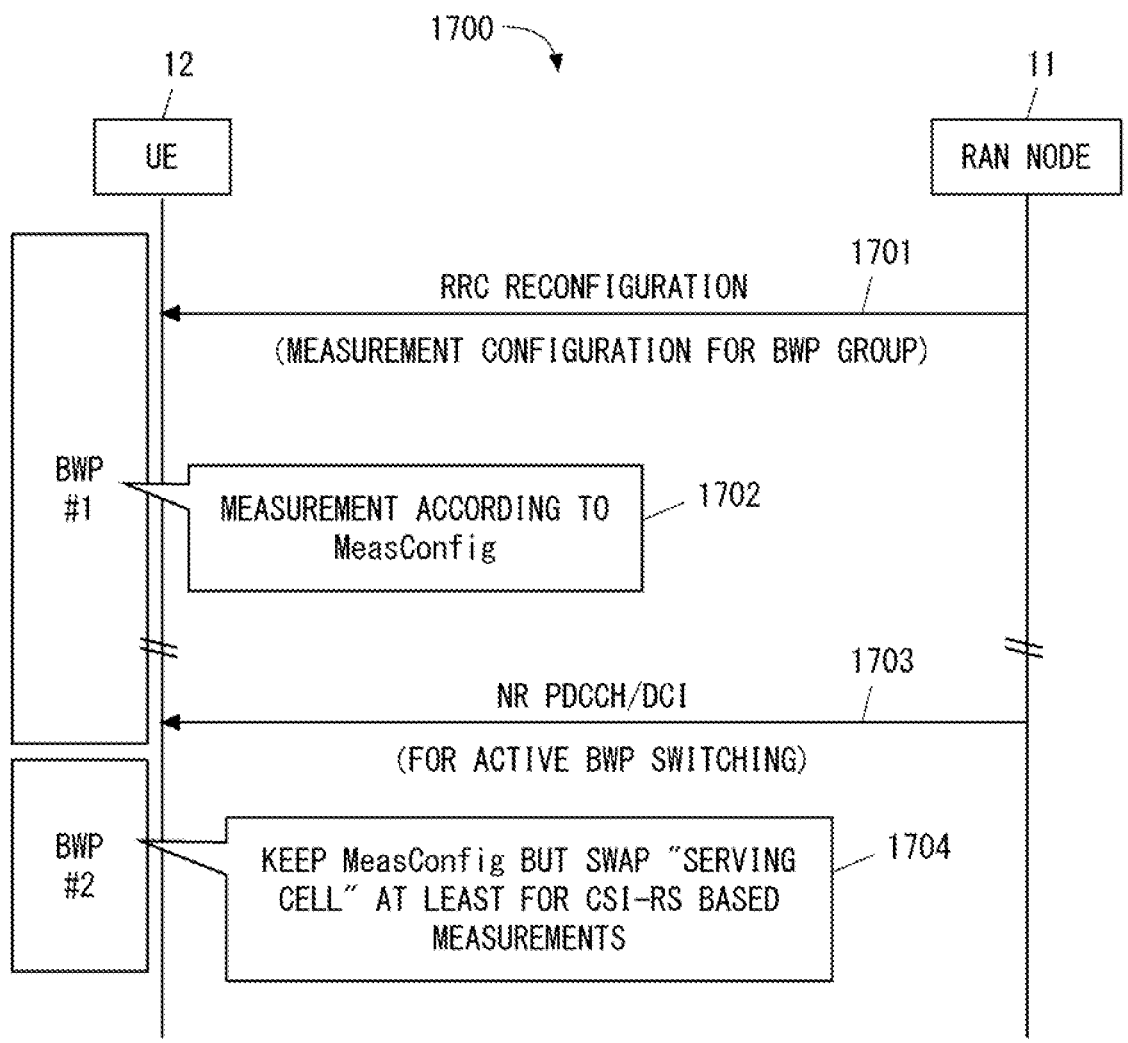
FIG. 17 is a sequence diagram showing an example of operations of a radio terminal and a RAN node according to a third embodiment.

FIG. 17 is a sequence diagram showing a process 1700 that is an example of operations of the RAN node 11 and the UE 12 according to this embodiment. It is assumed in this example that a BWP group consists of BWP #1 including an SSB and BWP #2 not including any SSBs, and that the UE 12 first camps on BWP #1 (i.e., BWP #1 is the active BWP).

In Step 1701, the RAN node 11 transmits an RRC Reconfiguration message to the UE 12. This RRC Reconfiguration message includes a measurement configuration corresponding to the situation where BWP #1 is the serving cell (serving BWP) and BWP #2 is the neighbor cell (neighbor BWP).

The UE 12 uses the measurement configuration received in Step 1701, and performs measurement in BWP #1 (e.g., RLM measurement, CSI measurement, RRM measurement) and measurement in the neighbouring cell including BWP #2 (e.g., RRM measurement) (Step 1702).

In Step 1703, the RAN node 11 transmits control information indicating switching of the active BWP from BWP #1 to BWP #2, i.e., DCI on a NR PDCCH, to the UE 12. In response to receiving this control information (PDCCH/DCI), the UE 12 switches the active BWP to BWP #2. Further, upon switching of the active BWP, the UE 12 uses the previously received (i.e., already stored) measurement configuration by replacing the relationship between the serving cell (serving BWP, active BWP) and the neighbor cell (non-serving BWP, neighbor BWP) (Step 1704). Specifically, the UE 12 regards the serving cell (serving BWP) in the already stored measurement configuration as BWP #2, and performs measurement in accordance with at least part of this measurement configuration. Stated differently, the UE 12 regards BWP #2 as the serving cell (serving BWP) and regards BWP #1 as the neighbor cell (neighbor BWP), and performs measurement in accordance with at least part of the already stored measurement configuration.

The measurement in Step 1704 may include SSB based measurement and CSI-RS based measurement. If the UE 12 is configured with SSB based measurement, the UE 12 may monitor the SSB in BWP #1 for RLM measurement. In this case, the UE 12 may continuously use the configuration regarding SSB based measurement in the measurement configuration corresponding to BWP #1 for SSB based measurement after switching of the active BWP from BWP #1 to BWP #2. In other words, the UE 12 may regard the serving cell (serving BWP) in the previously received (i.e., already stored) measurement configuration as BWP #2 for CSI-RS based measurement after switching of the active BWP from BWP #1 to BWP #2. Stated differently, the UE 12 regards BWP #2 as the serving cell (serving BWP) and regards BWP #1 as the neighbor cell (neighbor BWP), and performs measurements in accordance with at least part of the already stored measurement configuration.

In addition, or alternatively, measurement configurations for the carrier frequency (measObject) may be commonly used for measurements before and after switching of the active BWP, except for measurement configurations specific to BWP #1 and BWP #2.

In addition, or alternatively, the RAN node 11 may transmit a configuration of "s-measure" to the UE beforehand, using the measurement configuration. The s-measure is an RSRP threshold and used for determining the start of measurement of the neighbor cell. When the RSRP of the serving cell falls below the s-measure, the UE 12 starts measurement of the neighbor cell. Further, the UE 12 may select the target of the s-measure between the SSB (i.e. ssb-rsrp) and the CSI-RS (i.e. csi-rsrp), and in this case, the RAN node 11 may indicate, to the UE 12, which of SSB based and CSI-RS based the s-measure is. The UE 12 may make determination on the s-measure after switching of the active BWP from BWP #1 to BWP #2 by using a measured value (e.g., SSB based RSRP or CSI-RS based RSRP) for the serving BWP after switching (i.e., BWP #2). Alternatively, the UE 12 may make determination on the s-measure by using a measured value for the serving BWP before switching (i.e., BWP #1).

The RAN node 11 may notify in advance the UE 12 of the way of treating the s-measure after switching of the active BWP (i.e., which of a measured value for the active BWP before switching and a measured value for the active BWP after switching is to be used for determination on the s-measure after switching of the active BWP). The RAN node 11 may indicate, in the measurement configuration or the configuration information of the BWP set, the way of treating s-measure after switching of the active BWP. Alternatively, the UE 12 may determine the RS type of the target of the s-measure after switching the active BWP, according to the configuration of the RS type (e.g., SSB or CSI-RS) of the target of the s-measure before switching the active BWP. For example, when the RS type of the target of the s-measure before switching the active BWP is the SSB, the UE 12 may use a measured value for the SSB for determination of the s-measure after switching the active BWP. Not that, the UE 12 may perform measurement on the SSB in the active BWP before switching when the active BWP after switching does not include any SSBs, or may perform measurement on the SSB in the active BWP after switching when the active BWP after switching includes the SSB.

For example, when the s-measure in the measurement configuration defines an RSRP threshold for the RS (e.g., NR-SS) in the SSB, the RAN node 11 may notify in advance the UE 12 of the s-measure to be used after switching of the active BWP within the BWP group in Step 1701. For example, when the new active BWP (e.g., active BWP #2) after switching of the active BWP within the BWP group does not include the SSB, the RAN node 11 may configure in advance an RSRP threshold for the CSI-RS to be used for the s-measure after switching of the active BWP. Alternatively, when the s-measure in the measurement configuration defines an RSRP threshold for the CSI-RS (and when the configuration of CSI-RS in BWP #2 is transmitted from the RAN node 11 to the UE 12), the UE 12 may continuously use the configuration of the s-measure before switching, even after switching the active BWP from BWP #1 to BWP #2.

Figure 18:
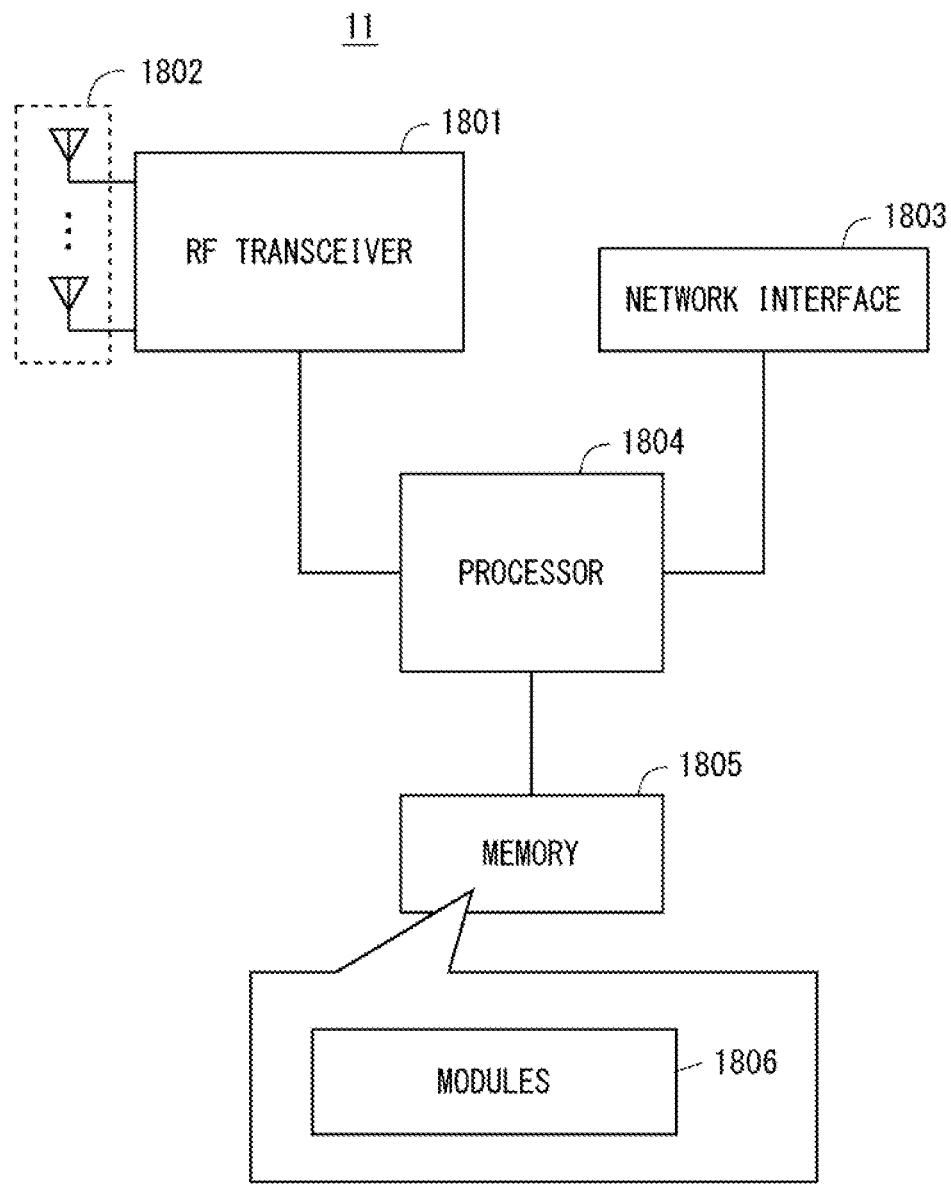
FIG. 18 is a block diagram showing a configuration example of a RAN node according to some embodiments.

The following provides configuration examples of the RAN node 11 and the UE 12 according to the above embodiments. FIG. 18 is a block diagram showing a configuration example of the RAN node 11 according to the above embodiments. Referring to FIG. 18, the RAN node 11 includes a Radio Frequency transceiver 1801, a network interface 1803, a processor 1804, and a memory 1805. The RF transceiver 1801 performs analog RF signal processing to communicate with NG UEs including the UE 12. The RF transceiver 1801 may include a plurality of transceivers. The RF transceiver 1801 is coupled to an antenna array 1802 and the processor 1804. The RF transceiver 1801 receives modulated symbol data from the processor 1804, generates a transmission RF signal, and supplies the transmission RF signal to the antenna array 1802. Further, the RF transceiver 1801 generates a baseband reception signal based on a reception RF signal received by the antenna array 1802 and supplies the baseband reception signal to the processor 1804. The RF transceiver 1801 may include an analog beamformer circuit for beam forming. The analog beamformer circuit includes, for example, a plurality of phase shifters and a plurality of power amplifiers.

The network interface 1803 is used to communicate with a network node (e.g., a control node and a transfer node of NG Core). The network interface 1803 may include, for example, a network interface card (NIC) conforming to the IEEE 802.3 series.

The processor 1804 performs digital baseband signal processing (i.e., data-plane processing) and control-plane processing for radio communication. The processor 1804 may include a plurality of processors. The processor 1804 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1804 may include a digital beamformer module for beam forming. The digital beamformer module may include a Multiple Input Multiple Output (MIMO) encoder and a pre-coder.

The memory 1805 is composed of a combination of a volatile memory and a non-volatile memory. The volatile memory is, for example, a Static Random Access Memory (SRAM), a Dynamic RAM (DRAM), or any combination thereof. The non-volatile memory is, for example, a mask Read Only Memory (MROM), an Electrically Erasable Programmable ROM (EEPROM), a flash memory, a hard disc drive, or any combination thereof. The memory 1805 may include a storage located apart from the processor 1804. In this case, the processor 1804 may access the memory 1805 via the network interface 1803 or an I/O interface (not shown).

The memory 1805 may store one or more software modules (computer programs) 1806 including instructions and data to perform processing by the RAN node 11 described in the above embodiments. In some implementations, the processor 1804 may be configured to load the software modules 1806 from the memory 1805 and execute the loaded software modules, thereby performing processing of the RAN node 11 described in the above embodiments.

Note that, if the RAN node 11 is a gNB-CU, the RAN node 11 does not need to include the RF transceiver 1801 (and the antenna array 1802).

Figure 19:
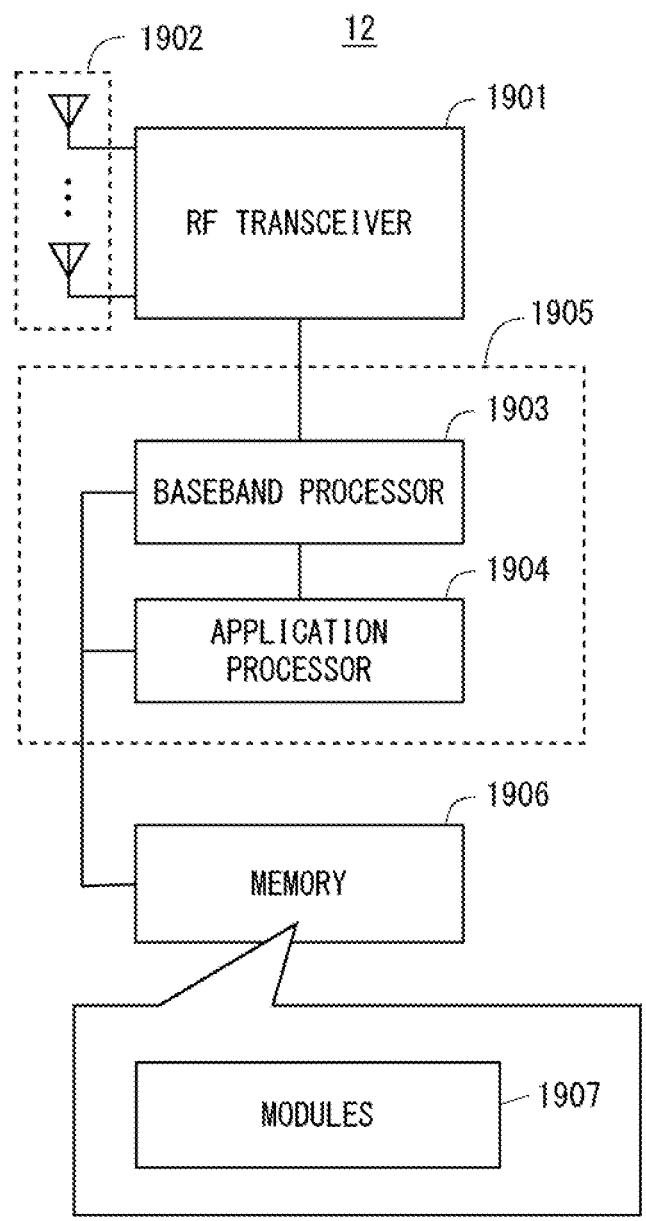
FIG. 19 is a block diagram showing a configuration example of a radio terminal according to some embodiments.

FIG. 19 is a block diagram showing a configuration example of the UE 12. A Radio Frequency (RF) transceiver 1901 performs analog RF signal processing to communicate with the NR NB 1. The RF transceiver 1901 may include a plurality of transceivers. The analog RF signal processing performed by the RF transceiver 1901 includes frequency up-conversion, frequency down-conversion, and amplification. The RF transceiver 1901 is coupled to an antenna array 1902 and a baseband processor 1903. The RF transceiver 1901 receives modulated symbol data (or OFDM symbol data) from the baseband processor 1903, generates a transmission RF signal, and supplies the transmission RF signal to the antenna array 1902. Further, the RF transceiver 1901 generates a baseband reception signal based on a reception RF signal received by the antenna array 1902, and supplies the baseband reception signal to the baseband processor 1903. The RF transceiver 1901 may include an analog beamformer circuit for beam forming. The analog beamformer circuit includes, for example, a plurality of phase shifters and a plurality of power amplifiers.

The baseband processor 1903 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1903 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 1903 may include processing of a Non-Access Stratum (NAS) protocol, an RRC protocol, and MAC CEs.

The baseband processor 1903 may perform MIMO encoding and pre-coding for beam forming.

The baseband processor 1903 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1904 described in the following.

The application processor 1904 is also referred to as a CPU, an MPU, a microprocessor, or a processor core. The application processor 1904 may include a plurality of processors (processor cores). The application processor 1904 loads a system software program (Operating System (OS)) and various application programs (e.g., a call application, a WEB browser, a mailer, a camera operation application, and a music player application) from a memory 1906 or from another memory (not shown) and executes these programs, thereby providing various functions of the UE 12.

In some implementations, as represented by a dashed line (1905) in FIG. 19, the baseband processor 1903 and the application processor 1904 may be integrated on a single chip. In other words, the baseband processor 1903 and the application processor 1904 may be implemented in a single System on Chip (SoC) device 1905. An SoC device may be referred to as a system Large Scale Integration (LSI) or a chipset.

The memory 1906 is a volatile memory, a non-volatile memory, or a combination thereof. The memory 1906 may include a plurality of memory devices that are physically independent from each other. The volatile memory is, for example, an SRAM, a DRAM, or any combination thereof. The non-volatile memory is, for example, an MROM, an EEPROM, a flash memory, a hard disc drive, or any combination thereof. The memory 1906 may include, for example, an external memory device that can be accessed from the baseband processor 1903, the application processor 1904, and the SoC 1905. The memory 1906 may include an internal memory device that is integrated in the baseband processor 1903, the application processor 1904, or the SoC 1905. Further, the memory 1906 may include a memory in a Universal Integrated Circuit Card (UICC).

The memory 1906 may store one or more software modules (computer programs) 1907 including instructions and data to perform the processing by the UE 12 described in the above embodiments. In some implementations, the baseband processor 1903 or the application processor 1904 may load these software modules 1907 from the memory 1906 and execute the loaded software modules, thereby performing the processing of the UE 12 described in the above embodiments with reference to the drawings.

Note that, the control plane processes and operations described in the above embodiments can be achieved by the elements other than the RF transceiver 1901 and the antenna array 1902, i.e., achieved by the memory storing the software modules 1907 and at least one of the baseband processor 1903 and the application processor 1904.

As described above with reference to FIGS. 17 and 18, each of the processors included in the RAN node 11 and the UE 12 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magnetooptical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

Each of the above-described embodiments may be used individually, or two or more embodiments may be appropriately combined with one another.

In the above embodiments, switching of the active BWP by DCI transmitted on a NR PDCCH is described. Note that, however, switching of the active BWP in the above-described embodiments may be done by a MAC CE or a timer (e.g., BWP Inactivity Timer).

The above embodiments are described mainly based on the assumption that only one BWP is activated for each UE (i.e. 1 active BWP per UE). However, the methods described in the above embodiments are also applicable to the case where multiple BWPs are simultaneously activated for a UE as a matter of course. For example, there are multiple active BWPs in a BWP set. Further, there are multiple active BWPs each corresponding to a respective one of multiple BWP groups configured in a BWP set, or there are multiple active BWPs in a BWP group.

The 5G UE may be configured to measure the beam quality in addition to the cell quality and report them to the RAN node (e.g., gNB). In the above-described embodiments, the UE 12 may perform RLM and beam monitoring in combination. The UE 12 may operate as follows when it detects beam failure in an active BWP and then fails beam recovery in this BWP (beam recovery failure). Specifically, when the layer 1 of the UE 12 correctly detects a beam of another BWP contained in the same (physical) cell as this BWP (e.g., another BWP in the BWP group), it notifies the layers 2 and 3 of the UE 12 of the success in beam recovery (beam recovery successful) in this another BWP. When the layer 3 of the UE 12 has already detected the degradation of the radio quality in RLM but is still in the state before RLF detection, it may stop the RLF timer and counter based on this notification from the L1 and return to the normal RLM operation.

The above-described embodiments may be applied also to MR-DC (e.g., EN-DC) and NR-NR DC. For example, the active BWP in the SCG may be switched by a DCI transmitted on a (NR) PDCCH. In this case, the RAN node (i.e., SN) that operates the SCG may transmit this (NR) PDCCH in the DL active BWP of the SCG, and the UE 12 may switch the DL active BWP according to any of the above-described embodiments in response to receiving this PDCCH (i.e., DCI). On the other hand, when the active BWP in the SCG is switched with a change of the cell defining SSB, the RAN node (i.e., MN) that operates the MCG may transmit, in an MCG cell (or a DL active BWP), an instruction for switching the active BWP in the SCG with a change of the cell defining SSB. The UE 12 may switch the active BWP in the SCG according to any of the above-described embodiments in response to receiving this instruction. For example, in the NR-NR DC, the SgNB may transmit control information containing an active BWP switching instruction to the Master gNB (MgNB) via an SN MODIFICATION REQUEST ACKNOWLEDGE message in the SN Modification procedure. Then, the MgNB may transmit this control information to the UE 12 via an RRC Reconfiguration message. Alternatively, in the (NG-)EN-DC, the SgNB may transmit this control information to the Master eNB (MeNB) via an SN MODIFICATION REQUEST ACKNOWLEDGE message in the SN Modification procedure. Then, the MeNB may transmit this control information to the UE 12 via an RRC Connection Reconfiguration message. Alternatively, the SgNB may transmit this control information directly to the UE 12 via a signaling bearer (e.g., SRB3) in the SCG.

Although the term "cell defining SSB" is used in the above embodiments, it may be referred to as a cell representative SSB because it is an SSB that is representative of a BWP corresponding to the cell from the UE perspective (i.e., physical cell) or of a BWP group corresponding to a set of the physical cells. Alternatively, the cell defining SSB may be referred to as a cell-specific SSB because it specifies a representative cell (physical cell) including this SSB. Further, the cell defining SSB may be referred to as a serving SSB because it is an SSB to be monitored when the UE camps on a BWP or BWP group including this SSB.

The sub-PCI described in the above embodiments may be associated with a BWP index.

The base BWP described in the above embodiments may be referred to as a default BWP, an initial BWP, a reference BWP, a primary BWP, an anchor BWP, or a master BWP. Specifically, the BWP on which the UE first camps when accessing the RAN node for the first time (i.e., when transitioning from Idle mode to Connected mode) may be referred to as a base BWP, a default BWP, an initial BWP, a reference BWP, a primary BWP, an anchor BWP, or a master BWP. In addition, or alternatively, a BWP which is not the base BWP among multiple BWPs included in one system bandwidth may be referred to as a sub-BWP, a secondary BWP, or a slave BWP.

Further, the above-described embodiments are merely examples of applications of the technical ideas obtained by the inventor. These technical ideas are not limited to the above-described embodiments and various modifications can be made thereto.

For example, the whole or part of the above embodiments can be described as, but not limited to, the following supplementary notes.

(Supplementary Note 1)

A radio terminal comprising:

a memory; and at least one processor connected to the memory, wherein the at least one processor is configured to, when a downlink bandwidth part (BWP) is switched from a first BWP to a second BWP without a change of a cell defining synchronization signal block (SSB), if a reference signal type for Radio Link Monitoring (RLM) is set to an SSB type, continue to use for RLM measurements a first SSB associated with the first BWP after switching of the downlink BWP to the second BWP.

(Supplementary Note 2)

The radio terminal according to Supplementary Note 1, wherein the at least one processor is configured to determine whether to change a reference signal to be used for the RLM measurements after switching of the downlink BWP, depending on whether the reference signal type for the RLM is the SSB type or a Channel State Information Reference Signal (CSI-RS) type.

(Supplementary Note 3)

The radio terminal according to Supplementary Note 1 or 2, wherein the at least one processor is configured to, when the downlink BWP is switched from the first BWP to the second BWP without a change of the cell defining SSB, if the reference signal type for the RLM is set to a Channel State Information Reference Signal (CSI-RS) type, use for the RLM measurements a second CSI-RS in the second BWP, instead of a first CSI-RS in the first BWP.

(Supplementary Note 4)

The radio terminal according to any one of Supplementary Notes 1 to 3, wherein the at least one processor is configured to, when the downlink BWP is switched from the first BWP to the second BWP without a change of the cell defining SSB, inherit a parameter related to the RLM, and the parameter includes a count value of a timer to be started to determine RLF upon a specified number of consecutive occurrences of out-of-synchronization.

(Supplementary Note 5)

The radio terminal according to any one of Supplementary Notes 1 to 4, wherein the at least one processor is configured to, when the downlink BWP is switched from the first BWP to the second BWP without a change of the cell defining SSB, use for CSI measurements a second CSI-RS in the second BWP, instead of a first CSI-RS in the first BWP.

(Supplementary Note 6)

The radio terminal according to any one of Supplementary Notes 1 to 5, wherein the at least one processor is configured to, when it is instructed to switch the downlink BWP from the first BWP to the second BWP with a change of the cell defining SSB, if the reference signal type for the RLM is set to the SSB type, discontinue using the first SSB associated with the first BWP for the RLM measurements.

(Supplementary Note 7)

The radio terminal according to any one of Supplementary Notes 1 to 6, wherein the at least one processor is configured to, when it is instructed to switch the downlink BWP from the first BWP to the second BWP with a change of the cell defining SSB, if the reference signal type for the RLM is set to the SSB type, use for the RLM measurements a second SSB associated with the second BWP, instead of the first SSB associated with the first BWP.

(Supplementary Note 8)

The radio terminal according to any one of Supplementary Notes 1 to 7, wherein the at least one processor is configured to determine whether to continue to use the first SSB associated with the first BWP for the RLM measurements depending on whether switching of the downlink BWP from the first BWP to the second BWP involves a change of the cell defining SSB.

(Supplementary Note 9)

The radio terminal according to any one of Supplementary Notes 6 to 8, wherein the at least one processor is configured to, when it is instructed to switch the downlink BWP from the first BWP to the second BWP with a change of the cell defining SSB, if the reference signal type for the RLM is set to the SSB type, reset a parameter related to the RLM, and the parameter includes a count value of a timer to be started to determine RLF upon a specified number of consecutive occurrences of out-of-synchronization.

(Supplementary Note 10)

The radio terminal according to any one of Supplementary Notes 1 to 7, wherein the RLM measurements include measuring downlink radio quality of a serving cell when the radio terminal is in a connected mode with a view to detecting out-of-synchronization and Radio Link Failure (RLF).

(Supplementary Note 11)

The radio terminal according to Supplementary Note 5, wherein the CSI measurements include measuring downlink radio quality of a serving cell when the radio terminal is in a connected mode with a view to transmitting to a radio access network node a report containing a Channel Quality Indicator (CQI) to be used for at least one of scheduling and link adaptation.

(Supplementary Note 12)

A method performed by a radio terminal, the method comprising, when a downlink bandwidth part (BWP) is switched from a first BWP to a second BWP without a change of a cell defining synchronization signal block (SSB), if a reference signal type for Radio Link Monitoring (RLM) is set to an SSB type, continuing to use for RLM measurements a first SSB associated with the first BWP after switching of the downlink BWP to the second BWP.

(Supplementary Note 13)

The method according to Supplementary Note 12, further comprising determining whether to change a reference signal to be used for the RLM measurements after switching of the downlink BWP, depending on whether the reference signal type for the RLM is the SSB type or a Channel State Information Reference Signal (CSI-RS) type.

(Supplementary Note 14)

The method according to Supplementary Note 12 or 13, further comprising, when the downlink BWP is switched from the first BWP to the second BWP without a change of the cell defining SSB, if the reference signal type for the RLM is set to a Channel State Information Reference Signal (CSI-RS) type, using for the RLM measurements a second CSI-RS in the second BWP, instead of a first CSI-RS in the first BWP.

(Supplementary Note 15)

The method according to any one of Supplementary Notes 12 to 14, further comprising, when the downlink BWP is switched from the first BWP to the second BWP without a change of the cell defining SSB, inheriting a parameter related to the RLM, wherein the parameter includes a count value of a timer that is started to determine RLF upon a specified number of consecutive occurrences of out-of-synchronization.

(Supplementary Note 16)

The method according to any one of Supplementary Notes 12 to 15, further comprising, when the downlink BWP is switched from the first BWP to the second BWP without a change of the cell defining SSB, using for CSI measurements a second CSI-RS in the second BWP, instead of a first CSI-RS in the first BWP.

(Supplementary Note 17)

The method according to any one of Supplementary Notes 12 to 16, further comprising, when it is instructed to switch the downlink BWP from the first BWP to the second BWP with a change of the cell defining SSB, if the reference signal type for the RLM is set to the SSB type, discontinuing using the first SSB associated with the first BWP for the RLM measurements.

(Supplementary Note 18)

The method according to any one of Supplementary Notes 12 to 17, further comprising, when it is instructed to switch the downlink BWP from the first BWP to the second BWP with a change of the cell defining SSB, if the reference signal type for the RLM is set to the SSB type, using for the RLM measurements a second SSB associated with the second BWP, instead of the first SSB associated with the first BWP.

(Supplementary Note 19)

The method according to any one of Supplementary Notes 12 to 18, further comprising, determining whether to continue to use the first SSB associated with the first BWP for the RLM measurements depending on whether switching of the downlink BWP from the first BWP to the second BWP involves a change of the cell defining SSB.

(Supplementary Note 20)

The method according to any one of Supplementary Notes 17 to 19, further comprising, when it is instructed to switch the downlink BWP from the first BWP to the second BWP with a change of the cell defining SSB, if the reference signal type for the RLM is set to the SSB type, resetting a parameter related to the RLM, wherein the parameter includes a count value of a timer to be started to determine RLF upon a specified number of consecutive occurrences of out-of-synchronization.

(Supplementary Note 21)

The method according to any one of Supplementary Notes 12 to 20, wherein the RLM measurements include measuring downlink radio quality of a serving cell when the radio terminal is in a connected mode with a view to detecting out-of-synchronization and Radio Link Failure (RLF).

(Supplementary Note 22)

The method according to Supplementary Note 16, wherein the CSI measurements include measuring downlink radio quality of a serving cell when the radio terminal is in a connected mode with a view to transmitting to a radio access network node a report containing a Channel Quality Indicator (CQI) to be used for at least one of scheduling and link adaptation.

(Supplementary Note 23)

A non-transitory computer readable medium storing a program to cause a computer to perform a method for a radio terminal, wherein the method comprises, when a downlink bandwidth part (BWP) is switched from a first BWP to a second BWP without a change of a cell defining synchronization signal block (SSB), if a reference signal type for Radio Link Monitoring (RLM) is set to an SSB type, continuing to use for RLM measurements a first SSB associated with the first BWP after switching of the downlink BWP to the second BWP.

REFERENCE SIGNS LIST

11 RAN NODE
12 UE
1804 PROCESSOR
1805 MEMORY
1903 BASEBAND PROCESSOR
1904 APPLICATION PROCESSOR
1906 MEMORY

The invention claimed is:

1. A radio terminal comprising:
a memory; and
at least one processor connected to the memory and configured to:
receive a Radio Link Monitoring (RLM) measurement configuration for a situation where a first bandwidth part (BWP) is an active BWP and a second BWP is an inactive BWP; and
when the active BWP is switched from the first BWP to the second BWP without a change of a cell defining synchronization signal block (SSB), if a reference signal type for Radio Link Monitoring (RLM) is set to an SSB type, continue to use for RLM measurements a first SSB associated with the first BWP after switching of the active BWP to the second BWP and use the RLM measurement configuration that has already been received, with exchanging the relationship between the active BWP and the inactive BWP.

2. The radio terminal according to claim 1, wherein the at least one processor is configured to determine whether to change a reference signal to be used for the RLM measurements after switching of the active BWP, depending on whether the reference signal type for the RLM is the SSB type or a Channel State Information Reference Signal (CSI-RS) type.

3. The radio terminal according to claim 1, wherein the at least one processor is configured to, when the active BWP is switched from the first BWP to the second BWP without a change of the cell defining SSB, if the reference signal type for the RLM is set to a Channel State Information Reference Signal (CSI-RS) type, use for the RLM measurements a second CSI-RS in the second BWP, instead of a first CSI-RS in the first BWP.

4. The radio terminal according to claim 1, herein
the at least one processor is configured to, when the active BWP is switched from the first BWP to the second BWP without a change of the cell defining SSB, inherit a parameter related to the RLM, and
the parameter includes a count value of a timer to be started to determine RLF upon a specified number of consecutive occurrences of out-of-synchronization.

5. The radio terminal according to claim 1, wherein the at least one processor is configured to, when it is instructed to switch the active BWP from the first BWP to the second BWP with a change of the cell defining SSB, if the reference signal type for the RLM is set to the SSB type, use for the RLM measurements a second SSB associated with the second BWP, instead of the first SSB associated with the first BWP.

6. A method performed by a radio terminal, the method comprising:
receiving a Radio Link Monitoring (RLM) measurement configuration for a situation where a first bandwidth part (BWP) is an active BWP and a second BWP is an inactive BWP; and
when the active BWP is switched from the first BWP to the second BWP without a change of a cell defining synchronization signal block (SSB), if a reference signal type for Radio Link Monitoring (RLM) is set to an SSB type, continuing to use for RLM measurements a first SSB associated with the first BWP after switching of the active BWP to the second BWP and use the RLM measurement configuration that has already been received, with exchanging the relationship between the active BWP and the inactive BWP.

7. The method according to claim 6, further comprising determining whether to change a reference signal to be used for the RLM measurements after switching of the active BWP, depending on whether the reference signal type for the RLM is the SSB type or a Channel State Information Reference Signal (CSI-RS) type.

8. The method according to claim 6, further comprising, when the active BWP is switched from the first BWP to the second BWP without a change of the cell defining SSB, if the reference signal type for the RLM is set to a Channel State Information Reference Signal (CSI-RS) type, using for the RLM measurements a second CSI-RS in the second BWP, instead of a first CSI-RS in the first BWP.

9. The method according to claim 6, further comprising, when the active BWP is switched from the first BWP to the second BWP without a change of the cell defining SSB, inheriting a parameter related to the RLM, wherein the parameter includes a count value of a timer that is started to determine RLF upon a specified number of consecutive occurrences of out-of-synchronization.

10. The method according to claim 6, further comprising, when it is instructed to switch the active BWP from the first BWP to the second BWP with a change of the cell defining SSB, if the reference signal type for the RLM is set to the SSB type, using for the RLM measurements a second SSB associated with the second BWP, instead of the first SSB associated with the first BWP.

11. A non-transitory computer readable medium storing a program to cause a computer to perform a method for a radio terminal, wherein the method comprises:

receiving a Radio Link Monitoring (RLM) measurement configuration for a situation where a first bandwidth part (BWP) is an active BWP and a second BWP is an inactive BWP; and when the active BWP is switched from the first BWP to the second BWP without a change of a cell defining synchronization signal block (SSB), if a reference signal type for Radio Link Monitoring (RLM) is set to an SSB type, continuing to use for RLM measurements a first SSB associated with the first BWP after switching of the active BWP to the second BWP and use the RLM measurement configuration that has already been received, with exchanging the relationship between the active BWP and the inactive BWP.

12. The non-transitory computer readable medium according to claim 11, wherein the method further comprises determining whether to change a reference signal to be used for the RLM measurements after switching of the active BWP, depending on whether the reference signal type for the RLM is the SSB type or a Channel State Information Reference Signal (CSI-RS) type.

13. The non-transitory computer readable medium according to claim 11, wherein the method further comprises, when the active BWP is switched from the first BWP to the second BWP without a change of the cell defining SSB, if the reference signal type for the RLM is set to a Channel State Information Reference Signal (CSI-RS) type, using for the RLM measurements a second CSI-RS in the second BWP, instead of a first CSI-RS in the first BWP.

14. The non-transitory computer readable medium according to claim 11, wherein the method further comprises, when the active BWP is switched from the first BWP to the second BWP without a change of the cell defining SSB, inheriting a parameter related to the RLM, wherein the parameter includes a count value of a timer that is started to determine RLF upon a specified number of consecutive occurrences of out-of-synchronization.

15. The non-transitory computer readable medium according to claim 11, wherein the method further comprises, when it is instructed to switch the active BWP from the first BWP to the second BWP with a change of the cell defining SSB, if the reference signal type for the RLM is set to the SSB type, using for the RLM measurements a second SSB associated with the second BWP, instead of the first SSB associated with the first BWP.

* * * * *